United States Patent [19]

Cheng

[11] Patent Number: 5,209,071
[45] Date of Patent: May 11, 1993

[54] IMMEDIATE HEAT UPGRADING AIR CONDITIONING SYSTEM AND ASSOCIATED COOL THERMAL STORAGE

[76] Inventor: Chen-Yen Cheng, 9605 LaPlaya St., NE., Albuquerque, N. Mex. 87111

[21] Appl. No.: 851,298

[22] Filed: Mar. 9, 1992

Related U.S. Application Data

[63] Continuation-in-part of Ser. No. 708,507, May 31, 1991.

[51] Int. Cl.$^5$ .................................................. F25J 5/00
[52] U.S. Cl. .......................................... 62/12; 62/123; 62/532
[58] Field of Search ............................ 62/12, 123, 532

[56] References Cited

U.S. PATENT DOCUMENTS

| | | | |
|---|---|---|---|
| 4,236,382 | 12/1980 | Cheng et al. | 62/537 |
| 4,505,728 | 3/1985 | Cheng et al. | 62/542 |
| 4,578,093 | 3/1986 | Cheng et al. | 62/532 |
| 4,650,507 | 3/1987 | Cheng et al. | 62/12 |
| 4,654,064 | 3/1987 | Cheng et al. | 62/532 |
| 4,810,274 | 3/1989 | Cheng et al. | 62/12 |

*Primary Examiner*—Ronald C. Capossela

[57] ABSTRACT

An Immediate Heat Upgrading Absorption Air Conditioning System (IHUA System) uses Immediate Heat Upgrading Absorption Air Handlers (IHUA air handlers). In this system, an absorption solution consisting of a common salt and water is circulated through the IHUA air handlers to upgrade heat taken from a first air mass or water and release the upgraded heat to a second air mass immediately. Production of chilled water is avoided. An IHUA air handler has one or more Modular Evaporation-Absorption Panels (E-A panels) with two sets of heat transfer fin assemblies. An E-A panel has two closely spaced heat conductive walls enclosing a film evaporative zone and a film absorption zone that respectively exchange heat with air to be cooled and air to be heated through the two sets of fin assemblies. An IHUA system can also provide cool thermal storage by storing water and absorbing solutions. IHUA systems can be used in air conditioning buildings and moving vehicles. A Modular Regeneration-Condensation Panel (R-C panel). An Integrated Evaporation-Absorption and Regeneration-Condensation Panel (EA-RC panel) is also introduced.

40 Claims, 14 Drawing Sheets

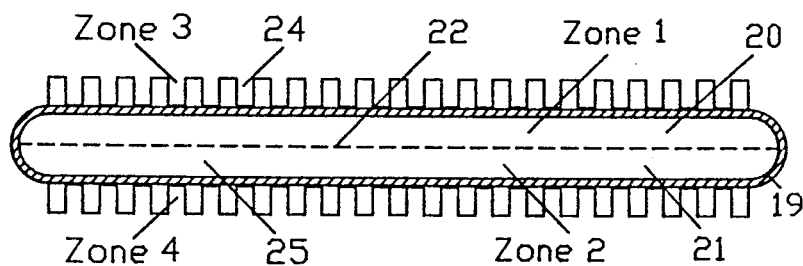
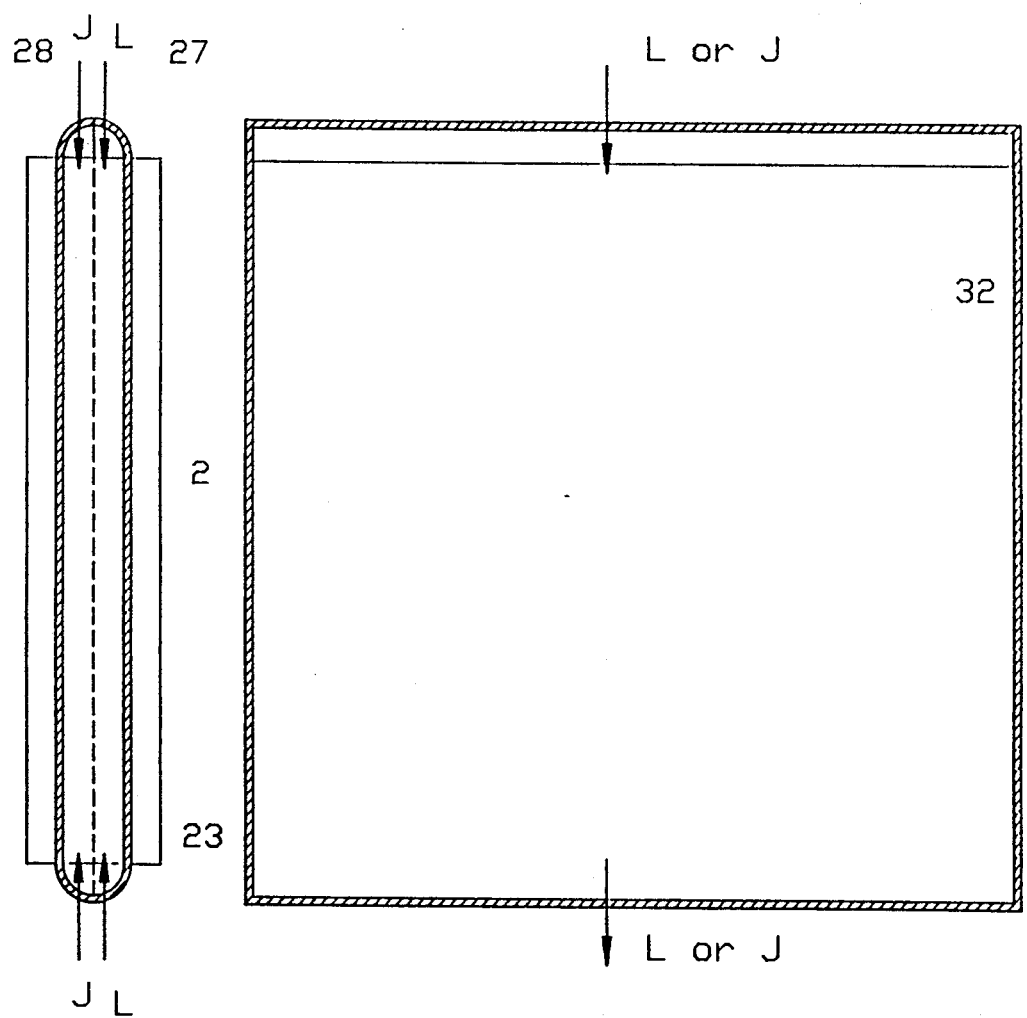
Fig. 9a
Fig. 9c
Fig. 9b

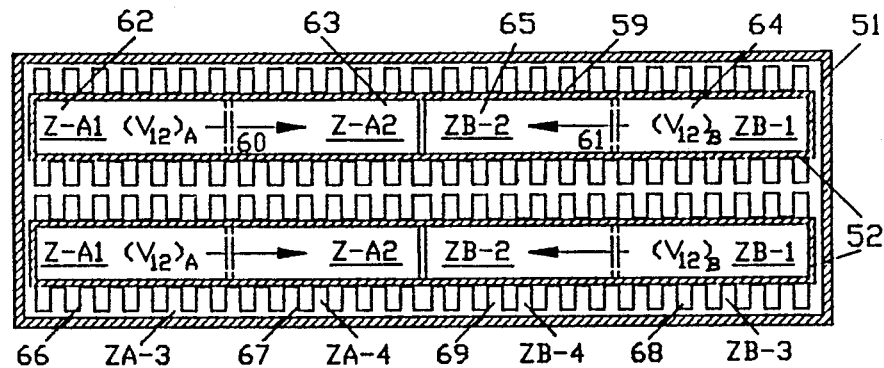
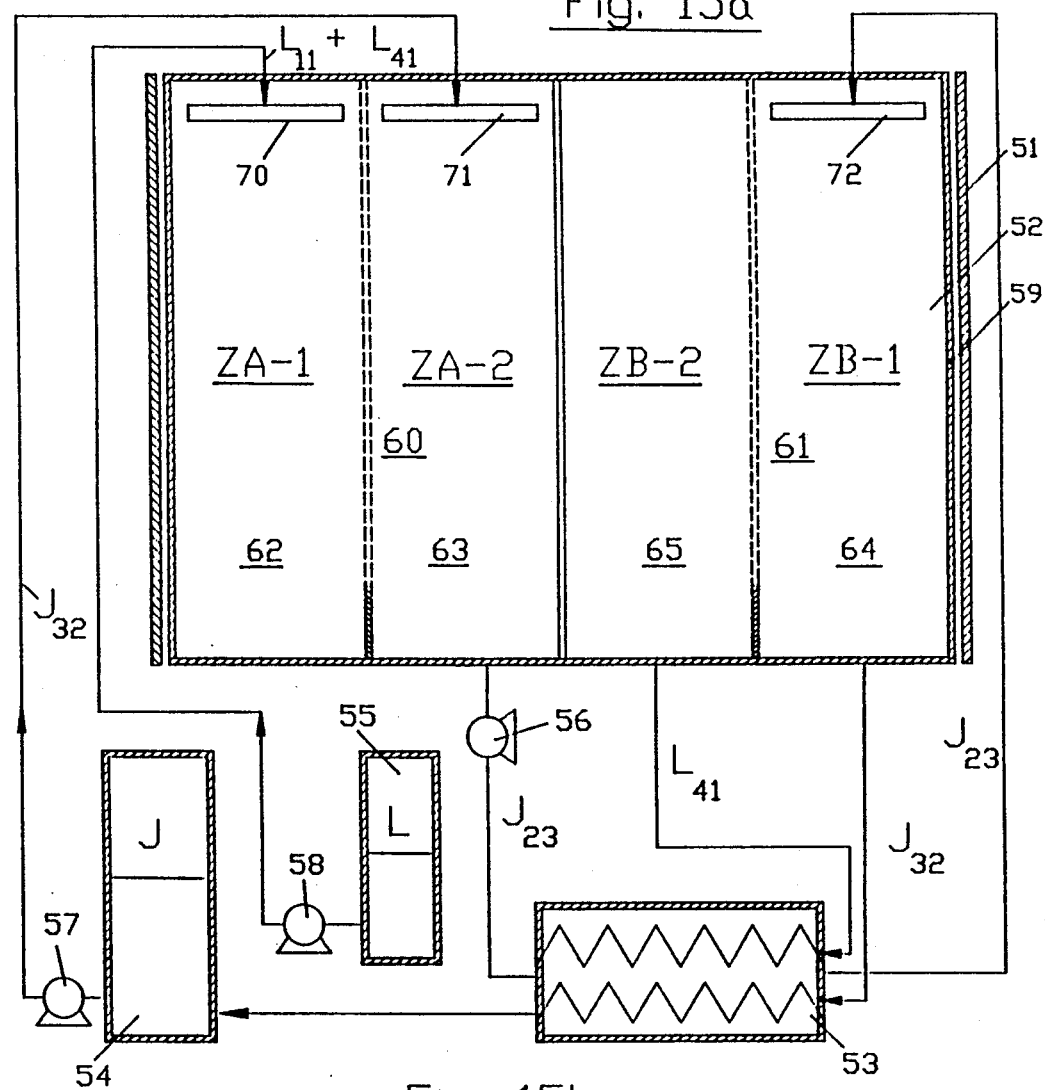

IMMEDIATE HEAT UPGRADING AIR CONDITIONING SYSTEM AND ASSOCIATED COOL THERMAL STORAGE

RELATED APPLICATION

This application is a continuation in part application of the following application: "High Performance In-Situ Freezing-Melting Process" Applicant: Chen-Yen Cheng, filing date: May 31, 1991 filing Ser. No. 07/708,507.

BACKGROUND OF THE INVENTION

1. Field of Invention

The processes and apparatus of the present invention are related to (a) air conditioning with heat upgrading by an absorption operation and (b) cool thermal storage that can be charged during off peak hours of power consumption and be discharged to provide air conditioning during peak hours of power consumption.

2. Brief Description of the Prior Art

Since Immediate Heat Upgrading Absorption Air Conditioning Systems [IHUA Systems] of the present invention can provide air conditioning by absorption for big areas and small areas and can also provide cool thermal storages by storing water and concentrated absorbing solutions, prior art on (a) absorption air conditioning, and (b) cool thermal storage are reviewed in the following:

2A. Absorption Air Conditioning

A large scale absorption air conditioning process comprises (a) a step of producing a stream of chilled liquid such as water or an aqueous solution of ethylene glycol at around 7.2° C. (45° F.), in an absorption liquid chiller and (b) a step of circulating a stream of the chilled liquid through air handlers to remove heat from indoor air and thereby return the liquid at around 15.5° C. (60° F.). Manufacturers of absorption chillers are Trane Corp. in Wisconsin and Carrier Corp. in New York State. There are several manufacturers in Japan including Mitsubishi and Yasaki. A commercial absorption liquid chiller has a large vacuum enclosure enclosing (a) an evaporation zone, (b) an absorption zone, (c) a regeneration zone and (d) a condensation zone. The processing steps are as follows:

(a) As water enters the evaporation zone, flash vaporization causes formation of a first vapor and a mass of internal chilled water at around 4.4° C. (40° F.). An external chill water at a first temperature around 15.5° C. (60° F.) then exchanges heat with the internal chill water thereby cooled to a second temperature at around 7.2° C. (45° F.). The chilled external chill water is then circulated to air handlers and heated to the first temperature and returned to the liquid chiller;

(b) The water vapor is drawn to the absorption zone and is absorbed in a strong absorbing solution such as 65% aqueous lithium bromide solution. The absorbing solution is thereby diluted and becomes a weak absorbing solution, say 60% lithium bromide. The heat of absorption is released to a cooling water stream;

(c) The weak absorbing solution then enters the regeneration zone, wherein it is heated and vaporized to generate a second water vapor and becomes a strong absorbing solution that is heat exchanged and returned to the absorbing zone;

(d) The second water vapor is condensed by rejecting heat to a cooling water stream and the condensate formed is heat exchanged and returned to the evaporation zone.

The operations in a small conventional absorption air conditioner are similar to those of a larger unit described, except that the internal chilled water produced in the evaporation zone is circulated directly to an air handler.

In contrast, a system of the present invention uses one or more Immediate Heat Upgrading Air Handlers, in which latent heat of vaporization is taken directly from indoor air or outdoor air without forming an intermediate chill water streams.

2B. Cool Thermal Storage

Chilled water, ice or a phase change material can be used as a cool storage medium. During a charging period, a cool storage medium is cooled and taken to a low enthalpy state, such as chilled water, ice, hydrate crystals; during a discharging period, the medium is heated and taken to a high enthalpy state. In contrast, during a charging period, the cool storing medium of a system of the present invention is taken to a high free energy state, i.e. strong absorbing solution and water, and during a discharging period, the medium is taken to a low free energy state, i.e. a weak absorbing solution. The conventional systems are described as follows;

(a) Chilled Water Storage Systems

Conceptually, chilled water storage appears to be simple. The major drawback is that the mass of water needed to provide a given cool storage capacity is large. Water stores cooling capacity by a decrease in its temperature. Chilled water storage is traditionally designed on a 11.1° C. (20° F.) temperature rise. Therefore, it takes almost 283 liters (10 ft$^3$) of water to provide one ton-hour of cool storage capacity.

(b) Static Ice Storage Systems

In a static ice storage system, ice is made on tubes by an indirect freezing operation and is melted in place by circulating water to thereby produce chilled water for air conditioning. The volume of ice must be permeated with channels of fluid to transport heat into and out of the body of ice. A major manufacturer of static ice storage systems is CALMAC Manufacturing Corporation of Englewood, N.J.. CALMAC Corporation uses water chiller manufactured by Trane Company in its ice storage systems.

(c) Dynamic Ice Storage Systems

In a dynamic ice storage system, ice is produced by a flake ice machine and flake ice is stored in a vessel. A stream of circulating water is brought in contact with flake ice to be chilled and returned for cooling process equipment or a building. Major manufacturers of dynamic ice storage systems are Turbo Company in Denton, Tex. and Mueller Company in Springfield, Mo.

(d) Slushy Ice Storage Systems

In a slushy ice storage system, a slushy ice mixture is formed by an indirect freezing operation. A mass of slushy ice may be directly circulated for air conditioning or a water stream may be chilled by the slushy ice and used for air conditioning. Developers of slushy ice systems are Chicago Bridge and Iron Company in Chicago, IL. and Sunwell Engineering Company in Canada.

(e) Eutectic Salt Storage Systems

Eutectic describes a mixture of compound easily fused or fusing at the lowest possible temperature. The eutectic salt used in thermal storage application is a salt hydrate that fuses at 47° F. In a crystalline form the salt fuses with several water molecules. In the amorphous form the salt dissociates from the water molecules, or "melts". Energy in the form of heat must be added to the hydrate to cause the dissociation. Transphase Systems, Incorporated in Huntington Beach, CA is a major supplier of eutectic cool storage systems.

(f) Vacuum Ice Storage

A vacuum ice storage system has been invented by Chen-Yen Cheng and is described in U.S. Pat. No. 5,059,228 issued on Oct. 22, 1991. The system comprises a vacuum vessel, a multitude of adiabatic ice making trays, a set of condenser tubes or plates and a set of vapor generating surfaces. During a charging period, refrigerant liquid is vaporized inside of the condenser tubes or plates. A part of the water in the adiabatic trays vaporizes to cause remaining water to freeze on the trays and the vapor is desublimed on the condenser surfaces. During a discharging period, a mass of external water is heat exchanged with a mass of internal water to cause vaporization of the internal water and thereby form a vapor which pressure is somewhat higher than the triple point pressure of water. The vapor so formed enters the adiabatic trays to melt the ice on the trays.

BRIEF DESCRIPTION OF THE INVENTION

The present invention is entitled "Immediate Heat Upgrading by Absorption". It consists of (1) taking in heat from a first mass of air at a first temperature by vaporizing a mass of water under a reduced pressure, (2) upgrading the heat by absorbing the water vapor into an absorbing solution and (3) discharging the heat of absorption at an elevated temperature to a second air mass or cooling water. The use of a chilled water loop is eliminated. As the results, Immediate Heat Upgrading Absorption Air Conditioning Systems (IHUA Systems), Immediate Heat Upgrading Air Handlers (IHUA air handlers), Modular Evaporation-Absorption Panels (E-A panels), Modular Regeneration-Condensation Panels (R-C panels) and Combined Modular Evaporation-Absorption and Regeneration-Condensation Panels (EA-RC panels) are herein introduced.

A basic IHUA system comprises (a) a first sub-system consisting of one or more IHUA air handlers, (b) a second subsystem for regenerating the working mediums and (c) a third subsystem for circulating the working medium. A comprehensive IHUA system further comprises a fourth subsystem for storing the working mediums. Thus, a comprehensive system also provides a cool thermal storage system. In an IHUA system, water and an absorbing solution are stored and circulated and used as heat upgrading mediums. Free energy drop associated with diluting the absorbing solution provides the driving force for the immediate heat upgrading. In contrast to the present invention, a conventional absorption air conditioning system uses a chiller to produce a stream of chilled liquid, such as chilled water, which is circulated to remove heat from room air.

An IHUA air handler uses one or more E-A panels. An E-A panel has two closely spaced heat conductive walls forming an enclosure. There are a first falling-film zone (Zone 1), a second falling-film zone (Zone 2) and a vapor passage within the enclosure. There are a first heat interaction Zone (Zone 3) and a second heat interaction zone (Zone 4) outside of the enclosure. In a Summer operation, a mass of water is vaporized in Zone 1 to remove heat from indoor air in Zone 3; the vapor so formed is absorbed in an absorbing solution is Zone 2 and release the heat of absorption to outdoor air in Zone 4. In a Winter operation, a mass of water is vaporized in Zone 2 to take in heat from outdoor air in Zone 4; the vapor so formed is absorbed in an absorbing solution in Zone 1 and release the heat of absorption to the indoor air in Zone 3.

An R-C panel is similar in construction as an E-A panel. One or more R-C panels are incorporated into a regeneration unit to regenerate the absorbing solution.

One or more combined EA-RC panels are used in constructing a complete IHUA air conditioning system for providing air conditioning for a moving vehicle or a room. IHUA systems have the following major advantages:

1. Temperature lift, defined as the difference between the absorption temperature and the evaporation temperature is low.
2. E-A, R-C and EA-RC panels can be mass produced.
3. E-A, R-C and EA-RC panels are hermetically sealed.
4. A common salt, such as $CaCl_2$ or $MgCl_2$, is used.
5. The systems can provide cool thermal storage by storing water and absorbing solutions.
6. Equipment cost and energy cost are low.
7. Operations are reliable.

BRIEF DESCRIPTION OF DRAWINGS

FIGS. 3a and 3b illustrate the structure and operations of a generic IHUA air handler. FIG. 3a shows that, during a period of time in Summer, an IHUA air handler takes in heat from room air upgrades the heat and discharges the upgraded heat to outside air or cooling water immediately to establish room cooling. FIG. 3b shows that during a period of time in Winter, the IHUA air handler takes in heat from outside air or water, upgrades the heat and discharges the upgraded heat to room air immediately for room heating. Water and an absorbing solution, such as an aqueous solution containing $CaCl_2$, are used as working mediums and are circulated through the IHUA air handlers. This is in contrast to a conventional absorption air conditioning system in which an absorption chiller is used to first produce a stream of chilled water at about 4.2° C. (40° F.) and the chilled water is circulated through air handlers in rooms to remove heat from room air and returned to the chiller at about 15.5° C. (60° F.). In a conventional system, an aqueous solution containing 60–65% LiBr is used as the absorbing solution. Since water and an absorbing solution are directly circulated through an IHUA air handler without first producing a stream of chilled water, the temperature lift needed in the heat upgrading is greatly reduced. Therefore, the concentration of the absorbing solution used is greatly reduced and an absorbing solution of $CaCl_2$ rather than LiBr may be used. There are great advantages in being able to use $CaCl_7$ because of (a) lower cost, (b) ready availability and (c) non-toxicity.

FIGS. 7 and 9 illustrate the structures and operations of two types of Modular Evaporation Absorption Panels (E-A panels). An E-A panel is used for heat interactions and immediate heat upgrading. An E-A panel has an enclosure enclosed by two closely spaced heat conductive walls and has an evaporation zone, an absorption zone and a vapor passage inside of the enclosure, and a first heat interaction zone with a first fin assembly and a second heat interaction zone with a second fin assembly outside of the enclosure. A Type A panel is a side-by-side panel in which the evaporation zone and the absorption zone are separated in the width direction; a Type B panel is a face-to-face panel in which the two zones are separated in the thickness direction.

FIG. 15a illustrate the structure and operations of an Integrated Modular Evaporation-Absorption and Regeneration-Condensation Panel (EA-RC panel). FIG. 15b also illustrate the layout of a complete absorption air conditioning and medium regeneration system using one or more EA-RC panels.

PREFERRED EMBODIMENT OF THE INVENTION

An Immediate Heat Upgrading Absorption Air Conditioning System (IHUA System) and an Immediate Heat Upgrading Air Absorption Handler (IHUA air handler) are herein disclosed. In an IHUA air handler, heat taken in from a first air or water mass at a first temperature is subjected to an absorption heat upgrading and the upgraded heat is immediately discharged to a second air or water mass at a second temperature that is higher than the first temperature. Due to the "Immediate Heat Upgrading Operation," a chilled water loop commonly used in a conventional system is eliminated. An IHUA system comprises one or more IHUA air handlers, a regenerator, heat exchangers and medium storages. Water and an absorbing solution are circulated through an IHUA system. An IHUA system may be used for heating and cooling a building, a moving vehicle, and an apparatus.

Figure 1:
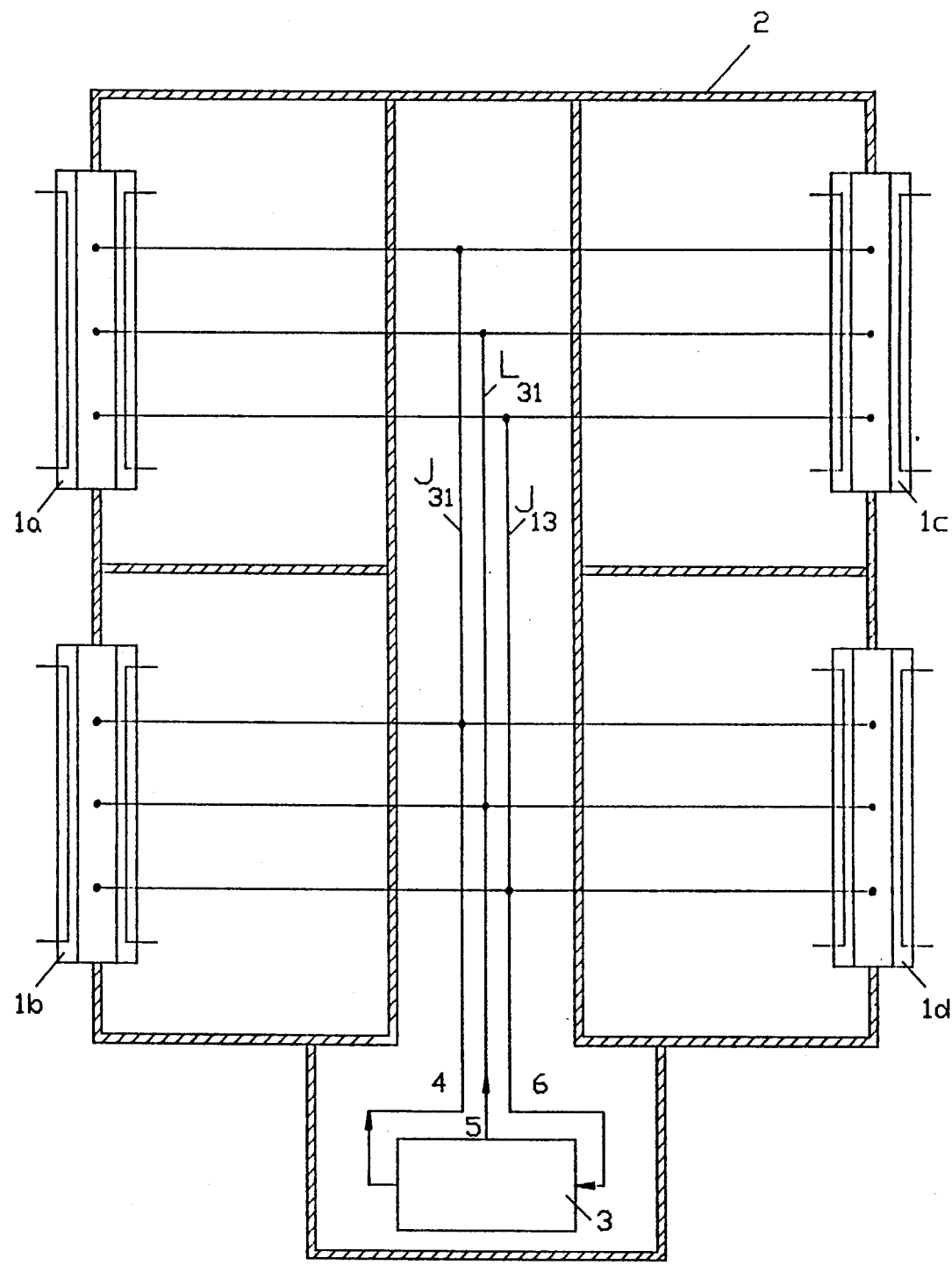
FIG. 1 illustrates the structure and operations of a basic Immediate Heat Upgrading Absorption Air Conditioning System (IHUA system). It comprises (a) a first sub-system that comprises one or more Immediate Heat Upgrading Absorption Air Handlers (IHUA air handlers) (b) a second sub-system for regenerating the working mediums and (c) a third sub-system for circulating the working mediums. An IHUA air handler takes in heat from a first air mass by vaporizing a mass of water, upgrade the heat by absorbing the vapor into an absorbing solution, and discharge the upgraded heat to a second air mass.

FIG. 1 illustrates a basic IHUA system used for cooling and heating a building. The system comprises a first sub-system having one or more IHUA air handlers $1a$, $1b$, $1c$, $1d$, installed in regions to be air conditioned in a building 2, a second subsystem 3 of regenerating a weak absorbing solution into a strong absorbing solution and a mass of water, and a third subsystem comprising conduits 4, 5, 6, and pumps (not shown) for delivering the strong absorbing solution $J_{31}$ and water $L_{31}$ to the air handlers and returning the weak absorbing solution $J_{13}$ to the regeneration sub-system. During a period of time in Summer, heat is taken from indoor air by the IHUA air handlers, the heat is upgraded by absorption, and the upgraded heat is discharged to the outdoor air or water immediately. During a period of time in Winter, heat is taken in from outdoor air or water by the IHUA air handlers, the heat is upgraded by absorption, and the upgraded heat is supplied to the indoor air immediately.

Figure 2:
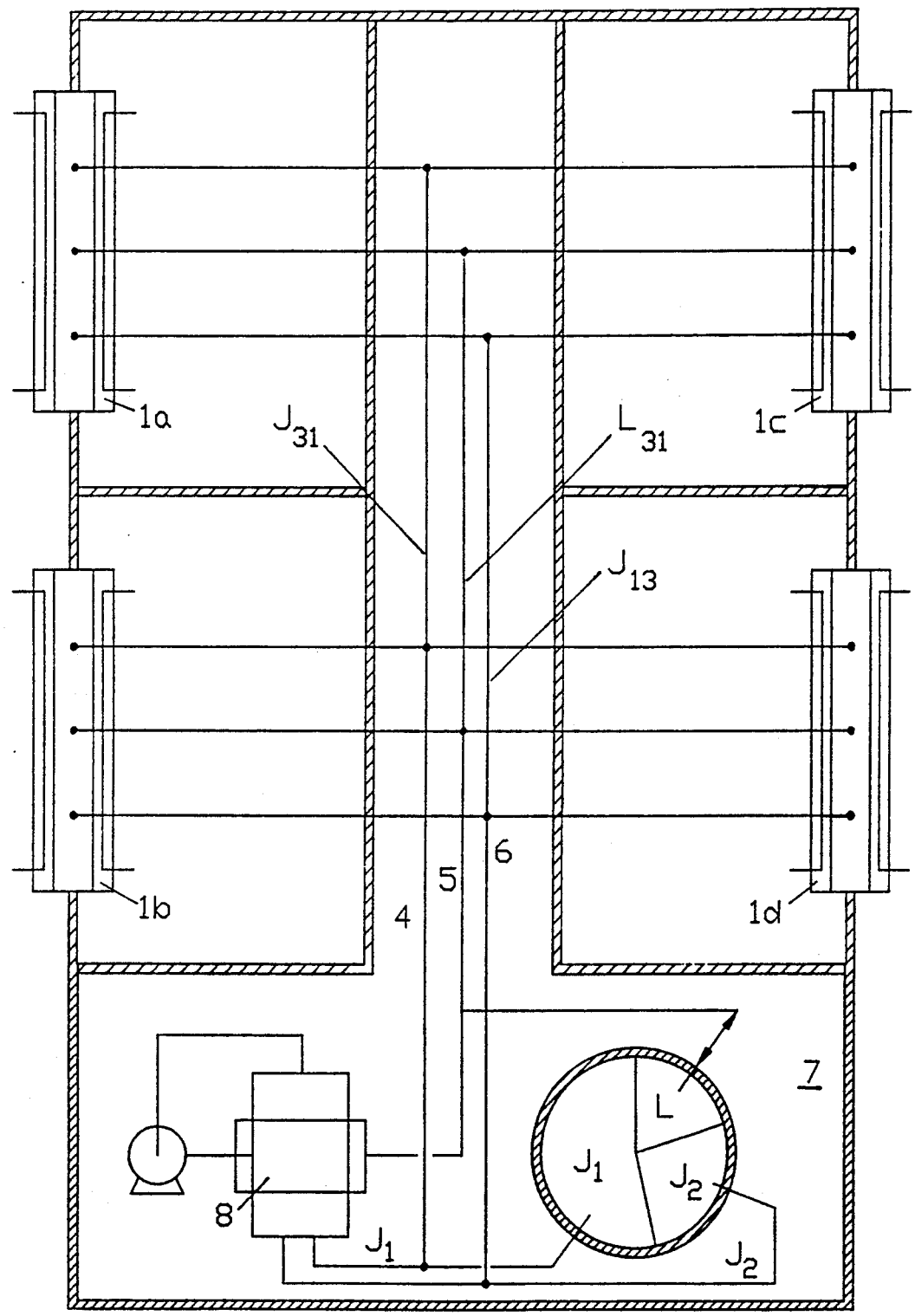
FIG. 2 illustrates a comprehensive IHUA system that further comprises a fourth subsystem for storing the working mediums.

FIG. 2 illustrates the structure and operations of a comprehensive IHUA system. The system comprises a first sub-system having one or more IHUA air handlers $1a$, $1b$, $1c$, $1d$, a second sub-system 7 comprising a vapor compression evaporator 8 and an integrated medium storage 9, and a third sub-system comprising conduits 4, 5, 6, and pumps (not shown) for delivering a strong absorbing solution and water to the IHUA air handlers and returning the weak absorbing solution to the regenerator. Regeneration of an absorbing solution can be accomplished by using an evaporator. One may use a single effect evaporator, a multiple effect evaporator, or a vapor compression evaporator. In the system illustrated, a vapor compression evaporator is shown.

In a basic IHUA system, there is no medium storage. Therefore, the weak absorbing solution is regenerated into the strong solution and water, which are returned to the IHUA air handlers immediately. In a comprehensive system, there are storages for the strong absorbing solution, the weak absorbing solution and the water. One may use an integrated storage 9 that store all the three liquids in a single vessel. Because of having medium storages, regeneration of the absorbing solution does not have to take place immediately. In other words, air condition takes place during a first period of a day, say daytime, and the weak absorbing solution is concentrated during a second period of the day, say night time. Therefore, a comprehensive IHUA system also serves as a cool thermal storage system for power leveling.

It is important to note the following major differences between an IHUA system and a conventional system:

(a) In an IHUA system, a strong absorbing solution and water are introduced into air handlers. Vaporization of water and absorption of the vapor into the strong absorbing solution provide the driving forces for the heat upgrading. As the result, water and the strong absorbing solution become the weak absorbing solution. From the standpoint of thermodynamics, the free energy of mixing provides the driving force for the heat upgrading.

(b) In a conventional absorption system, an absorption chiller is used to produce a stream of chilled water, say at 4.44° C. (40° F.), the chilled water is delivered to air handlers to cool the indoor air and become heated to say 15.55° C. (60° F.), and the heated water is returned to the chiller to be cooled.

It is also important to compare the cool storage of the present system and the conventional cool storage systems.

Conventional cool storage systems are (a) chilled water storage system, (b) Ice storage systems and (c) Hydrate crystal storages systems. These systems may be referred to as low enthalpy state cool storages, because, in each of these systems, a medium is taken to a low enthalpy state. In contrast, the cool storage of the present system may be referred to as a high free energy state cool storage, because the mediums are stored as a concentrated absorbing solution and water, which are in high free energy state compared to the weak absorbing solution produced during an air conditioning period.

In the cool thermal storage technology, the first important factor is the amount of heat that can be removed in the air conditioning unit per unit mass of cool storage medium stored. This factor is referred to as Unit Cool Thermal Energy Storing Capacity (CTE Storing Capacity). The CTE Storing Capacity of an IHUA system can be found from the heat removed from an air mass to be cooled by vaporizing a given amount of water and the amount of absorbing solution used to absorb the vapor and is therefore related to the solute concentrations in the strong absorbing solution and the weak absorbing solution. When these concentrations are 55% and 50%, respectively, the CTE Storing Capacity is 53.5 kcal/kg or 96 Btu/lb; when these concentrations are 55% and 47%, the CTE Storing Capacity is 85.55 kcal/kg or 153 Btu/lb. In addition, in an IHUA system, the stored mediums can be nearly completely utilized. Therefore, the medium utilization factor is very high. It can be seen that the CTE Storing Capacity for an IHUA is quite high compared with an ice storing system and a eutectic salt system. In comparison, the ideal CTE Storing Capacity for storing ice is 80 kcal/kg or 144 Btu/lb, and the actual CTE Storing Capacity, assuming the utilization factor is 80%, is only 64 kcal/kg or 115.2 Btu/lb. The ideal CTE Storing Capacity for storing a eutectic salt is only 22.8 kcal/kg or 41 Btu/lb. Assuming that the utilization factor is 80%, the actual CTE Storing Capacity for a eutectic salt storage system is only 18 kcal/kg or 32.8 Btu/lb. In an ice storage or a eutectic salt storage system, not all of the water or salt stored is frozen or melted. The utilization factor is to account for the incomplete freezing and melting.

The second important factor in the cool thermal storage technology is the energy consumption for storing a unit of cooling capacity. The energy consumption in storing ice is very high because the freezing temperature of water is so much lower than the desired air conditioning temperature. The energy consumption for a eutectic salt storage system is considerably lower than that of an ice storage system because the phase temperature is higher. The energy consumption for an IHUA system is also considerably lower than that of an ice storage system.

It is seen that the cool thermal storage system provided by an IHUA system has a high CTE Storing Capacity and requires low energy consumption. Therefore, an IHUA system provides a superb cool thermal storage system.

Figure 3A:
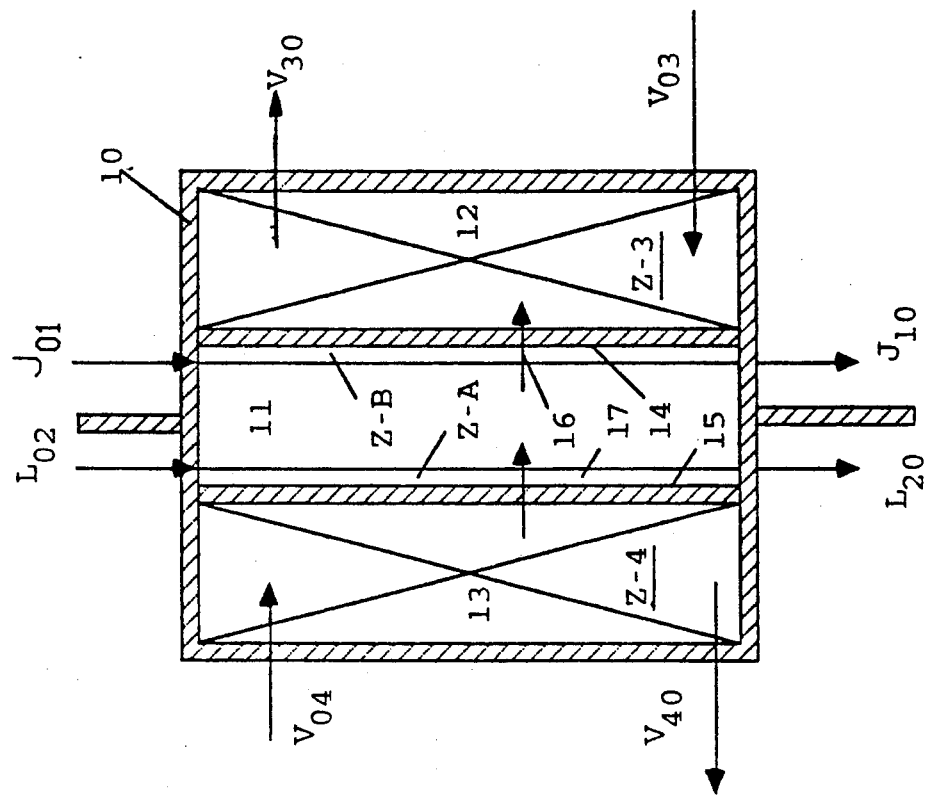
Figure 3A:
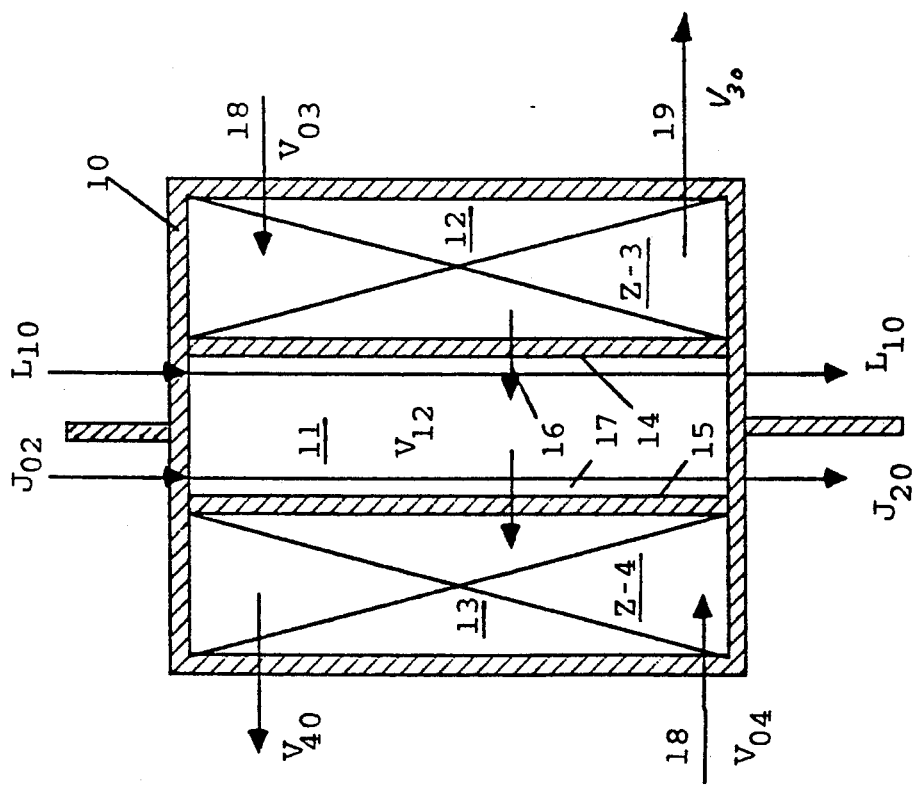

FIGS. 3a and 3b illustrate the structure and operations of a generic IHUA air handler. FIG. 3a illustrates the operations during a period of time in Summer; FIG. 3b illustrates the operations during a period of time in Winter. The air handler comprises an enclosure 10, a heat upgrading compartment 11, an indoor fin assembly 12 and an outdoor fin assembly 13. The heat upgrading compartment II is enclosed by two vertical walls 14, 15 and a first liquid film 16 and a second liquid film 17 are formed on the surfaces. The indoor fin assembly 12, provides heat transfer passage between the indoor air and the assembly 12, provides heat outdoor fin assembly provides heat transfer passage between the outdoor air and the second liquid film.

FIG. 3a illustrates the operations during a period of time in the Summer. Water $L_{01}$ and a strong absorbing solution $J_{02}$ are applied on the two walls of the heat upgrading compartment 14, 15, to respectively form a first liquid film 16, and a second liquid film 17. The two zones enclosing the two liquid films are respectively referred to as zone 1, 16, and zone 2, 17. In operation, indoor air $V_{03}$, 18 is introduced into the indoor fin assembly 12 in zone 3 and thereby cooled and discharged as $V_{30}$, 19. The heat released by the indoor air is transmitted through the fin assembly to the first liquid film to vaporize water and thereby form water vapor $V_{12}$ and remaining water $L_{11}$, which is recycled. The water vapor is absorbed into the absorbing liquid film. The absorbing solution introduced $J_{02}$ is thereby diluted and becomes a weak absorbing solution $J_{20}$. The heat of absorption released is discharged to the outdoor air $V_{04}$ through the outdoor fin assembly 13 in Zone 4. Therefore, heat is taken in from the indoor air, upgraded immediately, and the upgraded heat is discharged to the outdoor air immediately. Dilution of the absorbing solution provides the driving force for the heat upgrading. FIG. 3b illustrates the operations of the IHUA air handler during a period of time in Winter. The operations are similar to those of the Summer operations, except that heat is taken in from the outdoor air, upgraded immediately, and the upgraded heat is discharged to the indoor air immediately and that the absorbing solution and water are respectively applied to the first surface in Zone 1 and the second surface in Zone 2.

Figure 4:
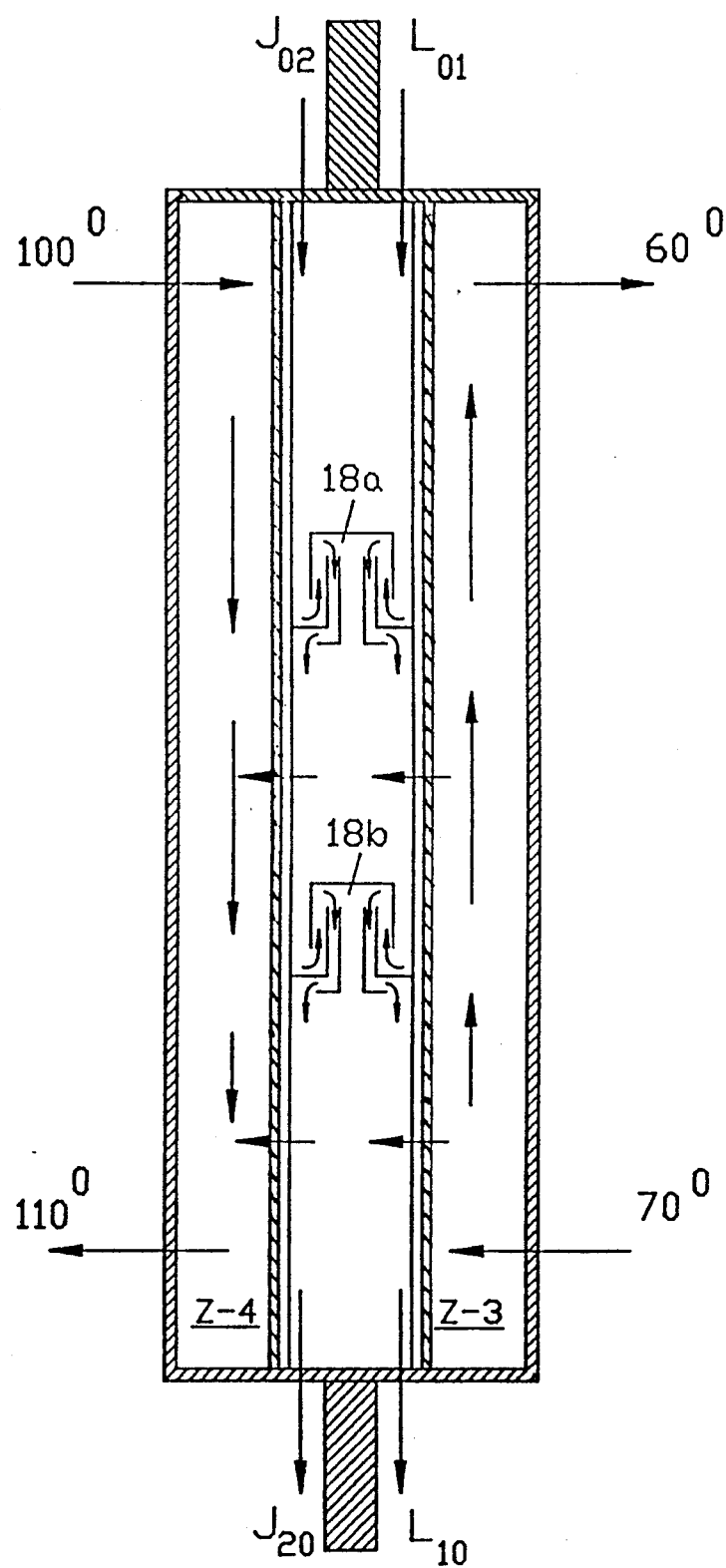
FIG. 4 illustrates a Multiple Pressure Zone IHUA air handler. It has several compartments within the panel so that evaporation of water and absorption of vapor take place at several different pressures. A less concentrated absorbing solution can be used as a working medium compared to that used in a single pressure zone IHUA air handler.

FIG. 4 illustrates a multiple pressure zone generic IHUA air handler. In this unit, the heat upgrading compartment is divided into two or more pressure zones by installing pressure isolating units 18a, and 18b. By installing one or more of these units, evaporation of water and absorption of the vapor into absorbing solution take place at two or more different pressures. It will be shown that a multiple pressure zone air handler has several important advantages over a single pressure zone air handler.

The temperature lift of an absorption heat upgrading system is defined as the difference between the absorption temperature and the evaporation temperature. In a system with a high temperature lift, say 45° C. or more, a highly concentrated absorbing solution, such as 60%-65% LiBr, is used. In a system with a low temperature lift, say less than 30° C., an aqueous solution of a common salt, such as $CaCl_2$ or $MgCl_2$, may be used.

Figure 5A:
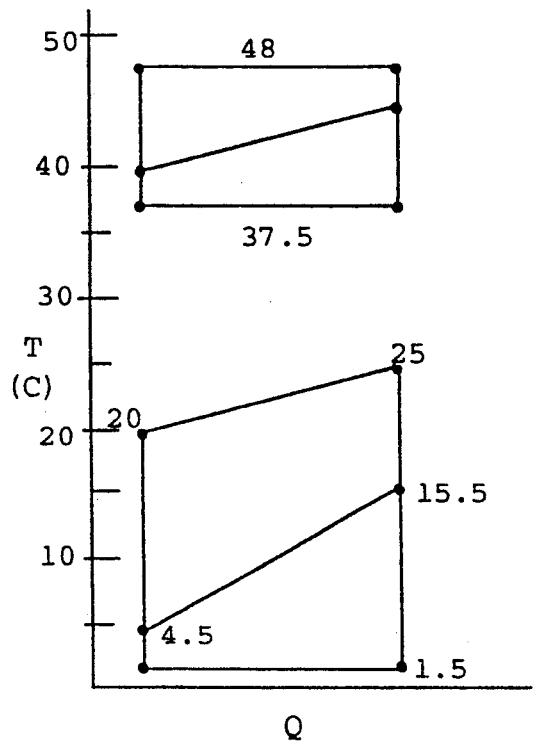
FIG. 5a illustrates the temperature distributions in a conventional large scale absorption air conditioning system using an absorption chiller. It shows that the temperature lift, defined as the difference between the absorption temperature and evaporation temperature, is around 46° C.

Temperature distributions in several system are illustrated in FIGS. 5a, 5b, 5c and 5d. FIG. 5a illustrates the temperature distributions in a large absorption chilled system. It shows that chilled water at 4.5° C. (40.1° F.) is produced in the chiller. The chilled water exchange heat with room air, thereby the water is heated to 15.6° C. (60° F.) and the room air is cooled from 25° C. to 20° C. In the chiller, water vaporizes at 1.5° C. to chill the water. A LiBr solution is used to absorb the water vapor at 48° C. and release heat to a cooling water stream which enters at 40° C. and leaves at 45° C. The heated water is cooled in a cooling tower by releasing heat to air at 37.5° C. In this system, the temperature lift is 48° C.−1.5° C.=46° C., which is high. For this system, an aqueous solution of LiBr is used as the absorbing solution.

Figure 5B:
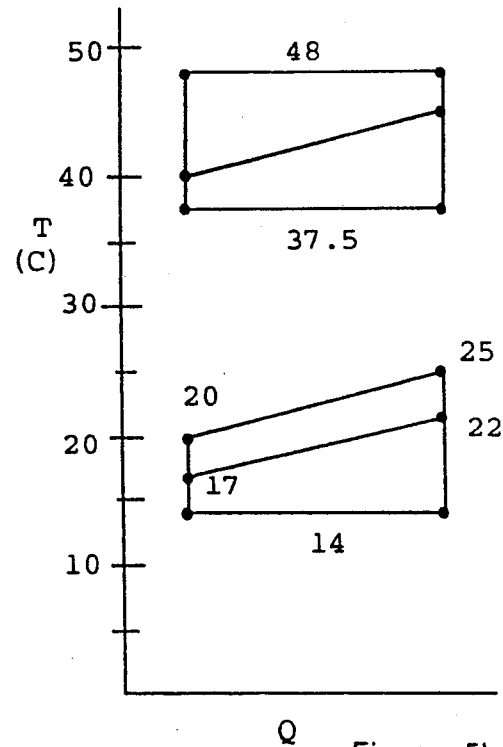
FIG. 5b illustrates the temperature distribution in a conventional small scale absorption air conditioning system. It shows that the temperature lift is around 34° C.

FIG. 5b illustrates temperature distributions in a small scale conventional absorption air conditioning system. In this system, the regeneration sub-system is at a short distance away from the air handlers. A stream of chilled water is produced by vacuum flash vaporization and circulated immediately. The evaporation temperature is around 14° C., and the absorbing temperature is around 48° C. Therefore, the temperature lift is 48° C.−14° C.=34° C.

Figure 5C:
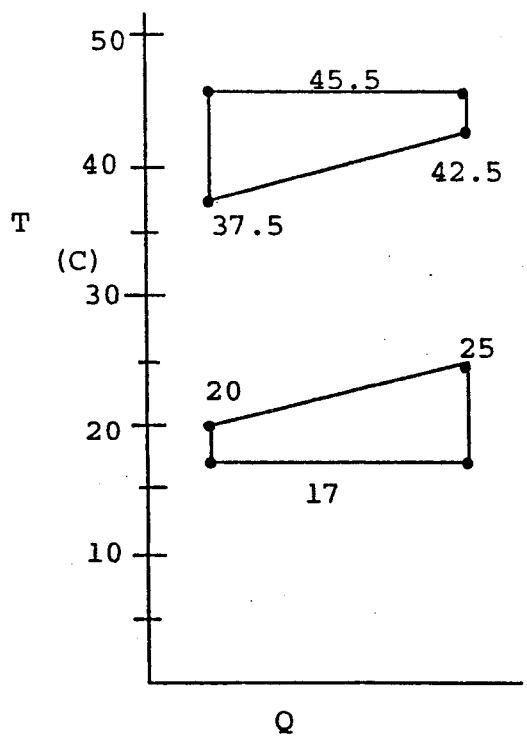
FIG. 5c illustrates the temperature distributions in a single pressure zone IHUA air handler. It shows that the temperature lift is around 28.5° C.

FIG. 5c illustrates temperature distributions in a single pressure zone IHUA air handler. It shows that water is evaporated under a single pressure at 17° C. to cool an air stream from 25° C. to 20° C. The vapor is absorbed into an absorbing solution in a single pressure zone at 45.5° C. so that the heat of absorption is discharged to an outdoor air to thereby heat it from 37.5° C. to 42.5° C. There is no intermediate chill water loop. The temperature lift is 45.5° C.−17° C. =28.5° C. For this system, an absorbing solution containing $CaCl_2$ can be used.

Figure 5D:
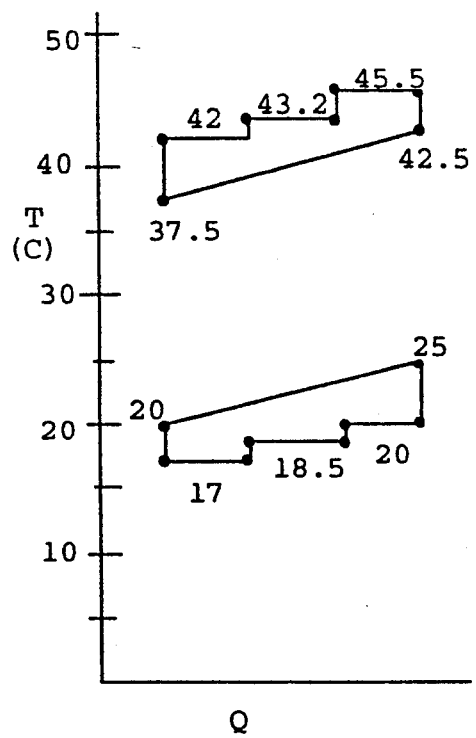
FIG. 5d illustrates the temperature distributions in a three pressure zone IHUA air handler. It shows that the temperature lift is around 25.5° C. In a system with a low temperature lift, an aqueous solution of a common salt, such as $CaCl_7$ or $MgCl_7$, may be used as the absorbing solution.

FIG. 5d illustrates temperature distributions in a multiple pressure zone IHUA air handler. It shows that water is evaporated under three different pressure so that the evaporation temperatures are 17° C., 18.5° C. and 20° C. respectively and the vapors are absorbed at 42° C., 43.2° C. and 45.5° C. respectively. The temperature lifting at the last stage is 45.5° C.−20° C.=25.5° C. For this system, an absorbing solution containing $CaCl_2$ can be used.

It has been shown that the temperature lift required in a multiple pressure zone air handler is several degrees lower than the temperature lift required in a single pressure zone air handler. Therefore, a less concentrated absorbing solution can be used. Furthermore, this leads to a significant energy saving in the regeneration operation.

Figure 6:
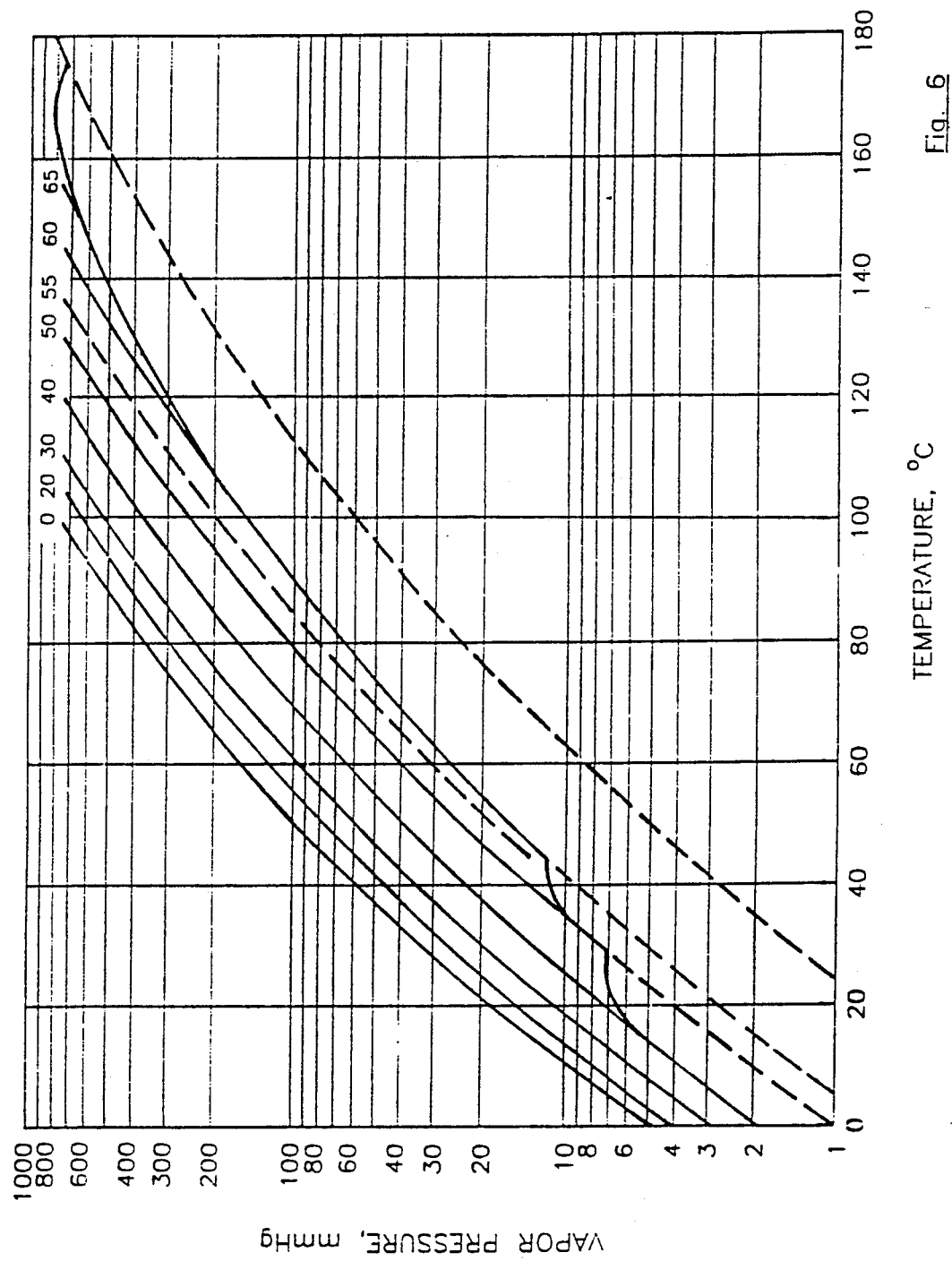
FIG. 6 shows a phase diagram of $CaCl_7$—$H_7O$ system. One can plot the conditions under which evaporation and absorption take place in a given air handler to determine the concentrations of absorbing solutions to use.

FIG. 6 shows a phase diagram of $CaCl_2$-$H_2O$ system taken from Calcium Chloride Handbook, published by Dow Chemical Corp. in Michigan, U.S.A. It shows vapor pressure lines for water and aqueous Calcium Chloride solutions of various concentrations and vapor pressures at saturated solutions with respect to $CaCl_2$-$6H_2O$, $CaCl_2$-$4H_2O$ and $CaCl_2$-$2H_2O$ at various temperatures. One can plot the conditions under which evaporation and absorption take place in various types of air handlers and determines the concentrations of the absorbing solutions to be used in these systems. It can also be shown that when the temperature lift is high, such as 50° C., aqueous solution of $CaCl_2$ can not be used because of formation of one or more hydrates of calcium chloride.

Two types of Modular Evaporation-Absorption Panels (E-A panels) are introduced. An E-A panel has an evaporation zone, an absorption zone and a vapor passage within the enclosed region. An E-A panel is used for heat interactions and immediate heat upgrading. In a Type A E-A panel, the evaporation zone and the absorption zone are in side-by-side arrangement; in a Type B E-A panel, the evaporation zone and the absorption zone area in face-to-face arrangement. An IHUA air handler uses one or more E-A panels. The E-A panel may also be referred to as Immediate Heat Upgrading Absorption Panels and designated as IHUA panels. The E-A panels of both types have been first introduced by the present inventor in conducting in-situ crystallization and melting operations in a co-pending application that is identified as follows:

"High Performance In-Situ Freezing Melting Process" Application Ser. No.: 07/708,507 filed on: May 31, 1991.

Figure 7A:
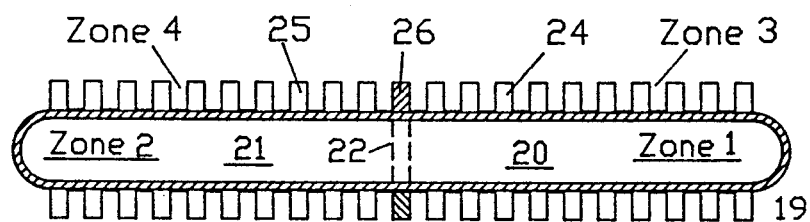
Figures 7B, 7C:
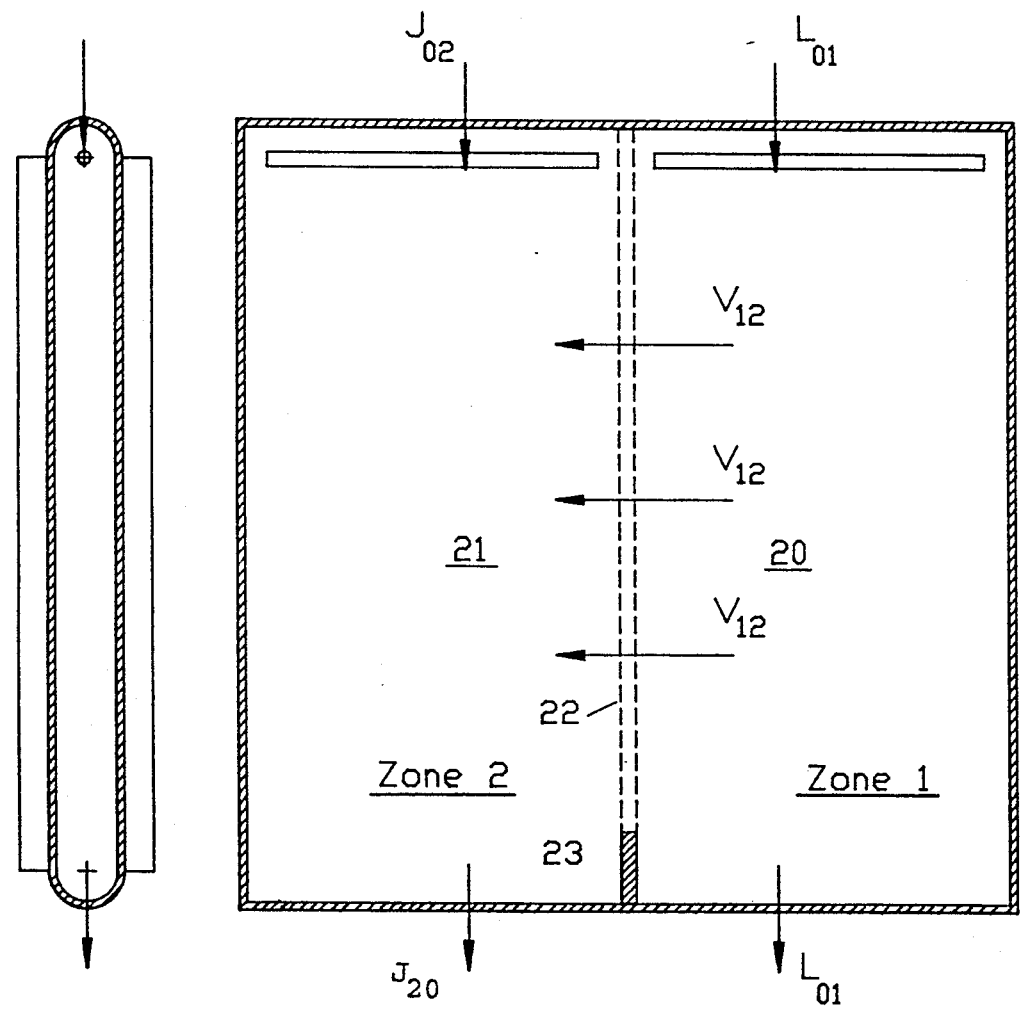

FIGS. 7a, 7b and 7c respectively illustrate a horizontal cross section, a vertical cross section and a side cross section of a Type A E-A panel. It has an enclosure 19 having two closely spaced heat conductive walls. The enclosed space may be referred to as a heat upgrading compartment. The enclosed region is divided into a first falling liquid film zone (zone 1) 20 and a second falling liquid film zone (Zone 2) 21 by a perforated partition 22 which serves as an entrainment separator. There is a liquid barrier 23 at the bottom of the enclosed space to prevent the two liquid masses in the two zones from mixing. There is a spray device 27 in zone 1 to distribute a liquid to form a falling liquid film; there is another spray device 28 in zone 2 to distribute another liquid to form another falling liquid film. There is a first external region (zone 3) 24 and a second external region (zone 4) 25 and a barrier 26 separating the two zones. One may install a fin assembly in zone 3 to enhance heat transfer; one may also install a fin assembly in zone 4 to enhance heat transfer.

It has been described earlier, by referring to FIGS. 4, 5c and 5d, that a multiple pressure zone IHUA air handler has advantages over a single pressure zone unit. An air handler with pressure isolating units has been illustrated by FIG. 4. A simple way to produce a multiple pressure zone E-A panel, or R-C panel to be described, can be explained by referring to FIG. 7c. When the two closely spaced heat conductive walls that are used in constructing an E-A panel or R-C panel are corrugated plates with horizontal grooves, the panel would have multiple horizontal mini-compartments separated by horizontal constricted regions. As a mass of liquid falls inside of the panel, pools of the liquid are formed above the constricted regions to provide liquid seals for maintaining pressure differentials between neighboring horizontal mini-compartments. A small gap is provided in a constricted region to allow liquid to pass through. Liquid films of water and absorbing solutions are formed in each mini-compartment of an E-A panel, so that the water vapor formed in the evaporation zone of a mini-compartment flows horizontally to the absorption zone of the same mini-compartment to be absorbed therein. Similar operations take place in a R-C panel. Water vapor formed in the regeneration zone of a mini-compartment flow to the condensation zone of the mini-compartment to be condensed therein.

Figure 8:
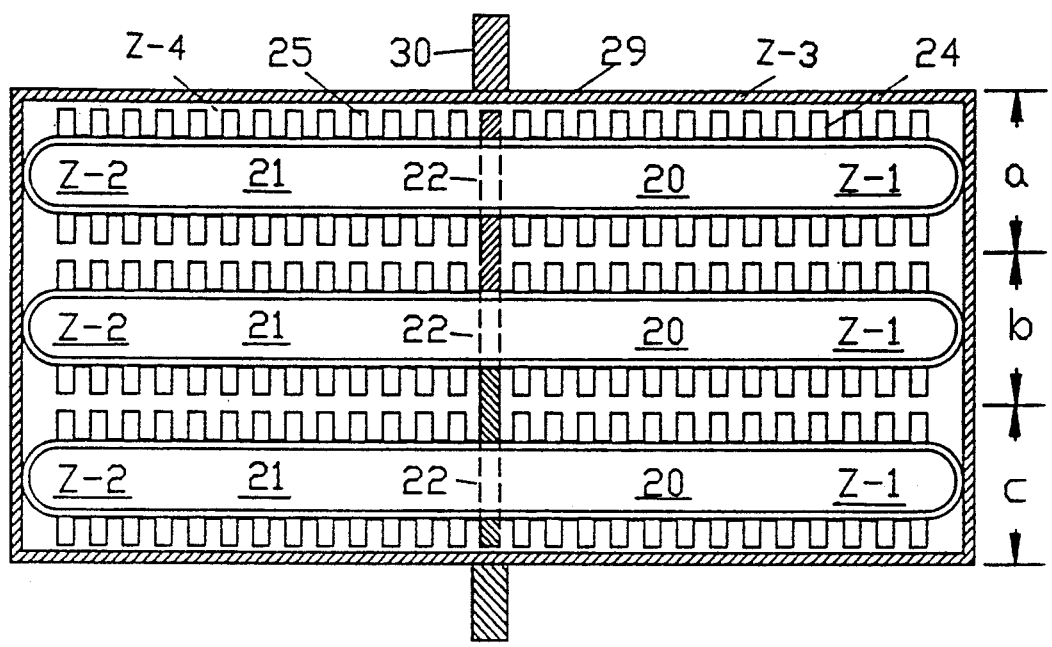
FIG. 8 illustrates the structure and operations of an IHUA air handler that uses one or more Type A E-A panels.

FIG. 8 illustrates the structure and operations of an IHUA air handler using several Type A E-A panels. The air handler has an enclosure 29 and three Type A E-A panels. The air handler is installed on a wall 30, so that zone 1 and zone 3 are inside of the building and zone 2 and zone 4 are outside of the building. In a Summer operation, indoor air is introduced into zone 3, outdoor air is introduced into zone 4, water is sprayed into zone 1, and an absorbing solution is sprayed into zone 2. Indoor air transfers heat through the first fin assembly in zone 3 and to the falling water film in zone 1 to vaporize water and form water vapor $V_{12}$. The indoor air is thereby cooled. The water vapor flows from zone 1 to zone 2 and is absorbed into the absorbing solution. The heat of absorption is transferred from zone 2 to the outdoor air in zone 4 through the second fin assembly. Therefore, the heat taken from indoor air is upgraded by the evaporation and absorption operations and the upgraded heat is discharged to the outdoor air immediately. During a period in time in Winter, water is introduced into zone 2 and an absorbing solution is introduced into zone 1. Heat is taken in from outdoor air, upgraded, and the upgraded heat is given to the indoor air. It is seen that the air handler can be used for both cooling and heating a room by simply switching the flows of water and absorbing solutions into zone 1 and zone 2.

There are ways of modifying the structure illustrated by FIG. 8. For instance, one may use a structure having a central passage and having Z-1 zones and Z-2 zones stretching out to the right side and left side respectively from the central passage. This structure is similar to the structure of FIG. 8 with the panels connected in the middle part.

Figure 10:
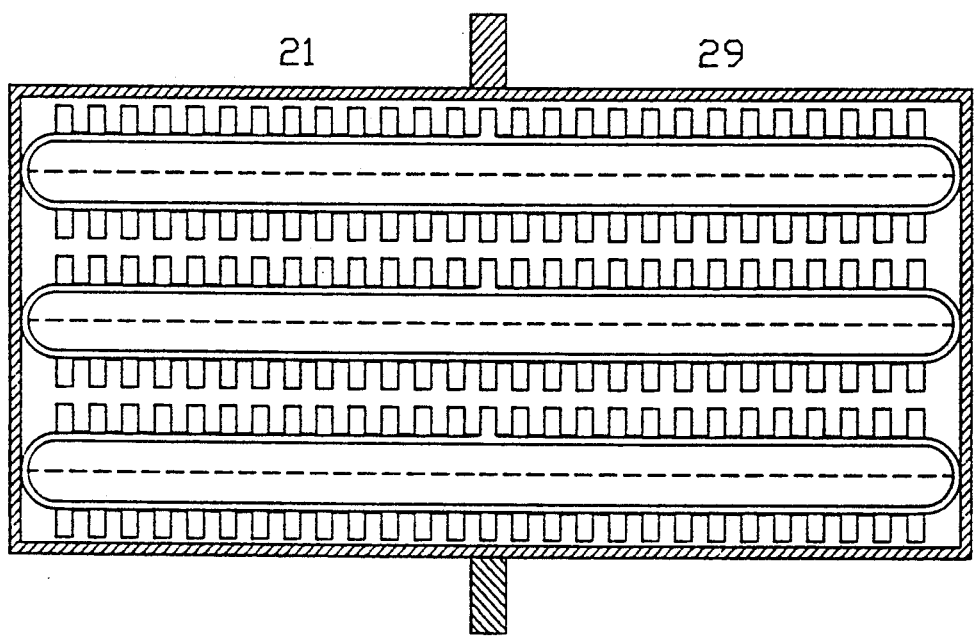
FIG. 10 illustrates the structure and operations of an IHUA air handler that uses one or more Type B E-A panels.

FIGS. 9a, 9b and 9c respectively illustrate a horizontal cross section, a vertical cross section and side cross section of a Type B E-A panel. The structure is very similar to that of a Type A panel, except that the enclosed space is divided into an evaporation zone 20 and an absorption zone 21 by a perforated partition that is extended in the width direction. The corresponding parts in the two types of E-A panels are referred to by the same number, so that the descriptions given for the Type A panel apply also to the Type B panel. FIG. 10 illustrates the structure and operations of an IHUA air handler using several Type B panels. The descriptions given for the air handler of FIG. 8 apply to the air handler of FIG. 10 also.

Figure 11:
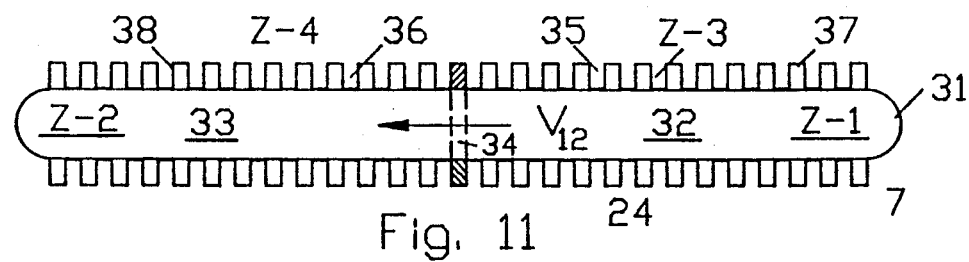
FIG. 11 illustrate the structure and operation of a Modular Single Effect Evaporation-Condensation Panel (E-C panel) that is used to concentrate a solution. When an E-C panel is used in an absorption refrigeration system, it may also be called a Modular Regeneration-Condensation Panel (R-C panel).

FIG. 11 illustrates a horizontal cross section of a single effect evaporation-condensation panel (E-C panel) that is used in concentrating a solution by evaporating the solution and condensing the resulting vapor. When it is used in association with an absorption heat upgrading system, an E-C panel may also be refer-red to as a Regeneration-Condensation Panel (R-C panel). An E-C panel comprises an enclosure 31, enclosed by two closely spaced heat conductive walls 31, an evaporation zone (zone 1) 32 and a condensation zone 33 and a perforated partition 34 inside of the enclosure, a heat source zone (zone 3) 35 and a heat sink zone (z-4) 36 outside of the enclosure. One may place a first fin assembly 37 in the heat source zone to enhance heat transfer; one may also place a second fin assembly 38 in the heat sink zone to enhance heat transfer.

Figure 12:
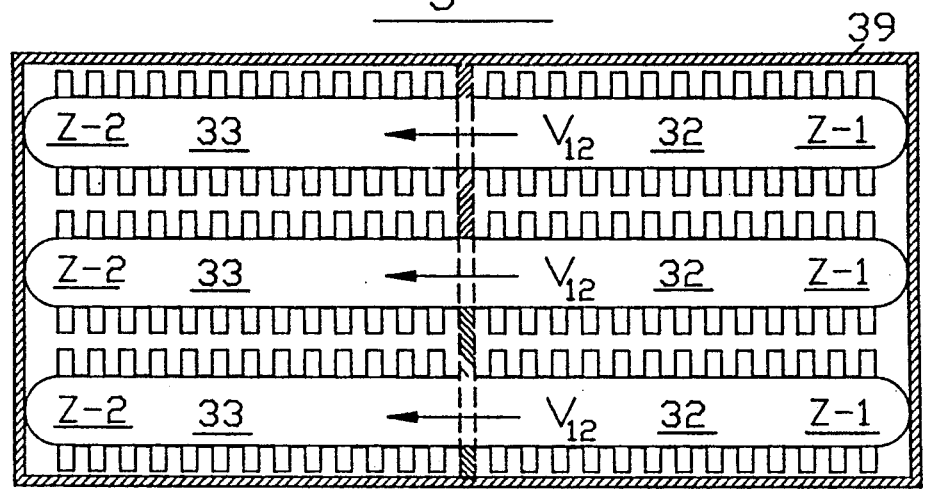
FIG. 12 illustrates an evaporation unit using one or more R-C panels.

FIG. 12 illustrates a solution concentration unit that comprises an enclosure 39 and one or more (three shown) E-C panels illustrated by FIG. 11. When this unit is used in regenerating an absorbing solution in an absorption heat upgrading system, it may also be referred to as a regeneration unit. In operation, a solution to be concentrated is applied to the inner walls in zone 1 of the E-C panels, a heat source medium is introduced into zone 3, and a heat sink medium is introduced into zone 4 of the panels. A heat source medium used may be steam, electricity, a hot liquid such as water after engine cooling, a hot gas such as a combustion gas or a flue gas. When the heat source medium is a hot gas, a fin assembly is needed to enhance heat transfer. A heat sink medium may be a cold liquid or a cold gas such as ambient air. When the heat sink medium is a gas, a fin assembly is needed to enhance heat transfer. Heat then flows from Zone 3 to Zone 1 to cause a part of the solution in Zone 1 to vaporize and thereby concentrate the solution; the vapor generated in Zone 1 of each panel $V_{12}$ flows to Zone 2 of the same panel and conden-ses therein; the heat of condensation then flows from Zone 2 to Zone 4 and is transferred to the heat sink medium. It is noted the vapor $V_{12}$ flows only a short distance. This is important because, in many cases, the operating pressures are low and pressure drop for the vapor flow has to be kept small.

Figure 13:
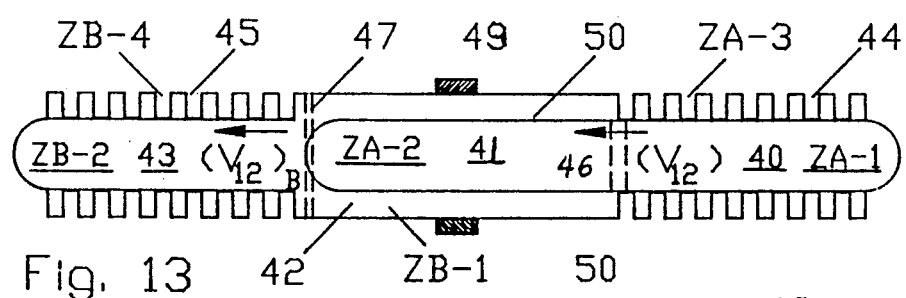
FIG. 13 illustrates the structure and operation of a Modular Double Effect Evaporation Condensation Panel (Double Effect E-C panel) which performs the functions of a double effect evaporator.

FIG. 13 illustrates a double effect evaporation-condensation panel. When this unit is used in association with an absorption heat upgrading system for regenerating the absorbing solu-tion, it may be referred to as a double effect regeneration panel. Referring to the figure, it has a first effect compartment, referred to as A-compartment, and a second effect compartment, referred to as B-compartment. The A-compartment has an evaporation zone, denoted as ZA-1 (zone 40) and a condensation zone, denoted as ZB-1 (zone 41). The B-compartment also has an evaporation zone, denoted as ZB-1 (zone 42), and a condensation zone, denoted as ZB-2 (zone 43). There is a heat source region outside of ZA-1 zone, denoted as ZA-3 (zone 44); there is a heat sink zone outside of ZB-2 zone, denoted as ZB-4 (zone 45). There is a perforated partition 46 between ZA-1 zone and ZA-2 zone; there is a perforated partition 47 between ZB-1 zone and ZB-2 zone. In operation, there is heat interaction between ZA-2 zone and ZB-1 zone. Therefore, these two zone together are referred to as a heat coupling zone.

Figure 14:
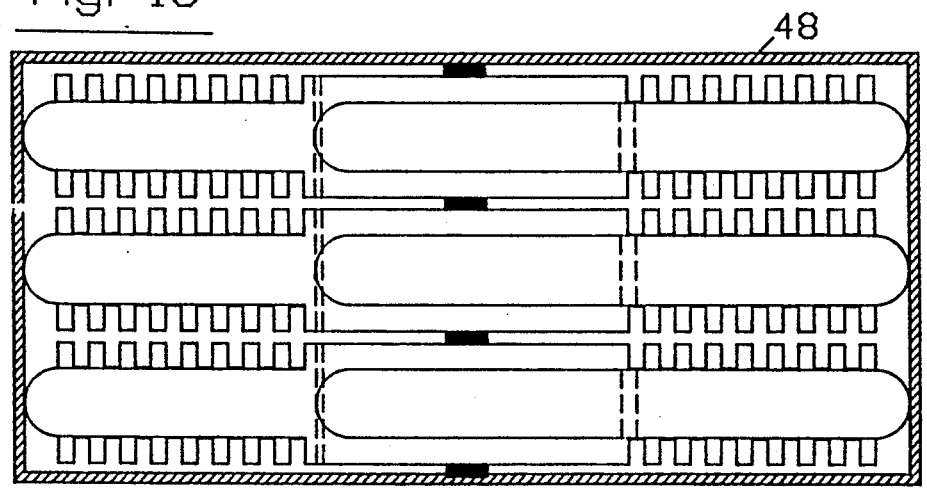
FIG. 14 illustrates a double effect evaporation unit that uses one or more Double Effect E-C panels. Used in an air conditioning system, they may be referred to as Double Effect R-C panels.

FIG. 14, illustrates a double effect solution concentration unit that comprises an enclosure 48 and one or more E-C panels (may be called R-C panels). It is seen that seals 49 are provided to prevent mixing of fluids in ZA-3 and ZB-4 zones. In operation, a solution to be concentrated is applied to the walls of ZA-1 zones as falling films, another solution to be concentrated is applied to the inner walls 50 of ZB-1, zone that are in heat communication with ZA-2 zone, a heating source medium is introduced into ZA-3 zone and a heat sink medium is introduced into ZB-4 zone. Then, heat transferres from the heat source medium in ZA-3 zone to the falling film solution in ZA-1 zone to generate vapor $(V_{12})_A$; the vapor passes through the perforated partition 46 to ZA-2 zone to be condensed therein; the heat of condensation is transmitted to ZB-1 zone to generate vapor $(V_{12})_B$; the vapor passes through the perforated partition 47 to condense in the ZB-2 (zone 43); the heat of condensation is transmitted to ZB-4 (zone 45) to transfer heat to the heat sink medium. A heat source medium may be steam, electricity, a hot liquid such as hot water, or a hot gas such as hat air or flue gas or combustion gas. A heat sink medium may be a cold liquid or a cold gas.

One may extend the approach illustrated in FIGS. 13 and 14 to devise a unit with even higher number of effects, such as a triple effect unit. In the panel illustrated by FIG. 14, ZB-1 zone is of a shape of a fork that holds on the ZA-2 zone. One may reverse this and produce a panel having ZA-2 zone shaped as a fork that hold on ZB-1 zone.

FIG. 15a and 15b illustrate an Immediate Heat Upgrading Absorption Air Conditioning System using one or more Doubly Integrated Evaporation-Absorption and Regeneration-Condensation Panels (EA-RC panels). The system comprises an outer enclosure 51, one or more EA-RC panels 52, one or more heat exchangers 53, an absorbing solution storage 54, a water storage 55 and several pumps 56, 57, 58. An EA-RC panel can be considered as a combination of an E-A panel and a R-C panel described earlier.

An EA-RC panel has an enclosure 59 having two closely spaced heat conductive walls. The enclosed space is divided into compartments, i.e. A-compartment 60 and B-compartment 61. There are an evaporation zone ZA-1 zone 62, and an absorption zone, ZA-2 zone 63 in the A-compartment; there are an evaporation zone, ZB-1 (zone 64), and a condensing zone, ZB-2 (zone 65) in the B-compartment. There are a heat source zone, ZA-3 (zone 66), outside of ZA-1 zone and a heat sink zone, ZA-4 (zone 67), outside of ZA-2 zone. A fin assembly may be place in each of ZA-3 and ZA-4 zones to enhance heat transfer. There are also a heat source zone, ZB-3 zone 68, outside of ZB-1 zone and a heat sink zone, ZB-4 zone 69, outside of ZB-2 zone. A fin assembly may be placed in each of the ZB-3 and ZB-4 zones to enhance heat transfer. These are spraying devices 70, 71, 72 in the ZA-1, ZA-2 and ZB-1 zones, respectively.

In operation, water $(L_{11}+L_{41})$, strong absorbing solution $J_{32}$, and weak absorbing solution $J_{23}$ are respectively introduced into ZA-1, ZA-2 and ZB-1 zones respectively through the spraying devices 70, 71, 72. In addition, a low temperature heat source medium and a low temperature sink medium are respectively introduced into the ZA-3 and ZA-4 zones; a high temperature heat source medium and a high temperature heat sink medium are respectively introdeced into the ZB-3 and ZB-4 zones. The low temperature heat source medium is the fluid, such as indoor air, outdoor air or water to be cooled; the low temperature heat sink medium is the fluid, such as indoor air, outdoor air, or water to be heated; the high temperature heat source medium is the heat source used to regenerate the absorbing solution; the high temperature heat sink is the fluid such as outdoor air or water to be heated. The operational steps are as follows;

(a) Heat transfers from the low temperature heat source medium in ZA-3 region to water in ZA-1 region to thereby generate water vapor $(V_{12})_A$ and cool the low temperature heat source medium, such as indoor air or outdoor air;

(b) The water vapor $(V_{12})_A$ is absorbed into a strong absorbing solution $J_{32}$ to thereby dilute the solution and form a weak absorbing solution $J_{23}$ and discharge the heat to the low temperature heat sink medium such as indoor air, outdoor air, or water;

(c) The weak absorbing solution is pumped by a pump 56 exchanges heat with a strong absorbing solution and a condensate stream in the heat exchanger 53 and the introduced into ZB-1 zone;

(d) Heat flows from the high temperature heat source medium in ZB-3 zone to the solution in ZB-1 zone to vaporize the solution and thereby from a vapor stream $(V_{12})_B$ and the strong absorbing solution $J_{32}$;

(e) The vapor $(V_{12})_B$ condenses in ZB-2 zone and the heat is transferred to the high temperature heat sink medium;

(f) Both the strong absorbing solution and the condensate exchange heat with the weak absorbing solution in the heat exchanger 53 and are respectively introduced into the absorbing solution storage 54 and the water storage 55. Pumps 57 and 58 are used to pump the strong absorbing solution and water into ZA-2 and ZA-1 zones respectively.

The system illustrated by FIGS. 15a and 15b are useful when the region to be cooled and the heat source for solution regeneration are closely located. Therefore, this system is useful in providing air conditioning for a moving vehicle such as an automobile. Here, the high temperature heat source medium is hot water or hot air produced by exchanging heat with the engine. A system illustrated may also be used for room cooling. In this case, combustion of a fuel or an electric power supply provides the heat needed for regenerating the absorbing solution.

Figure 16:
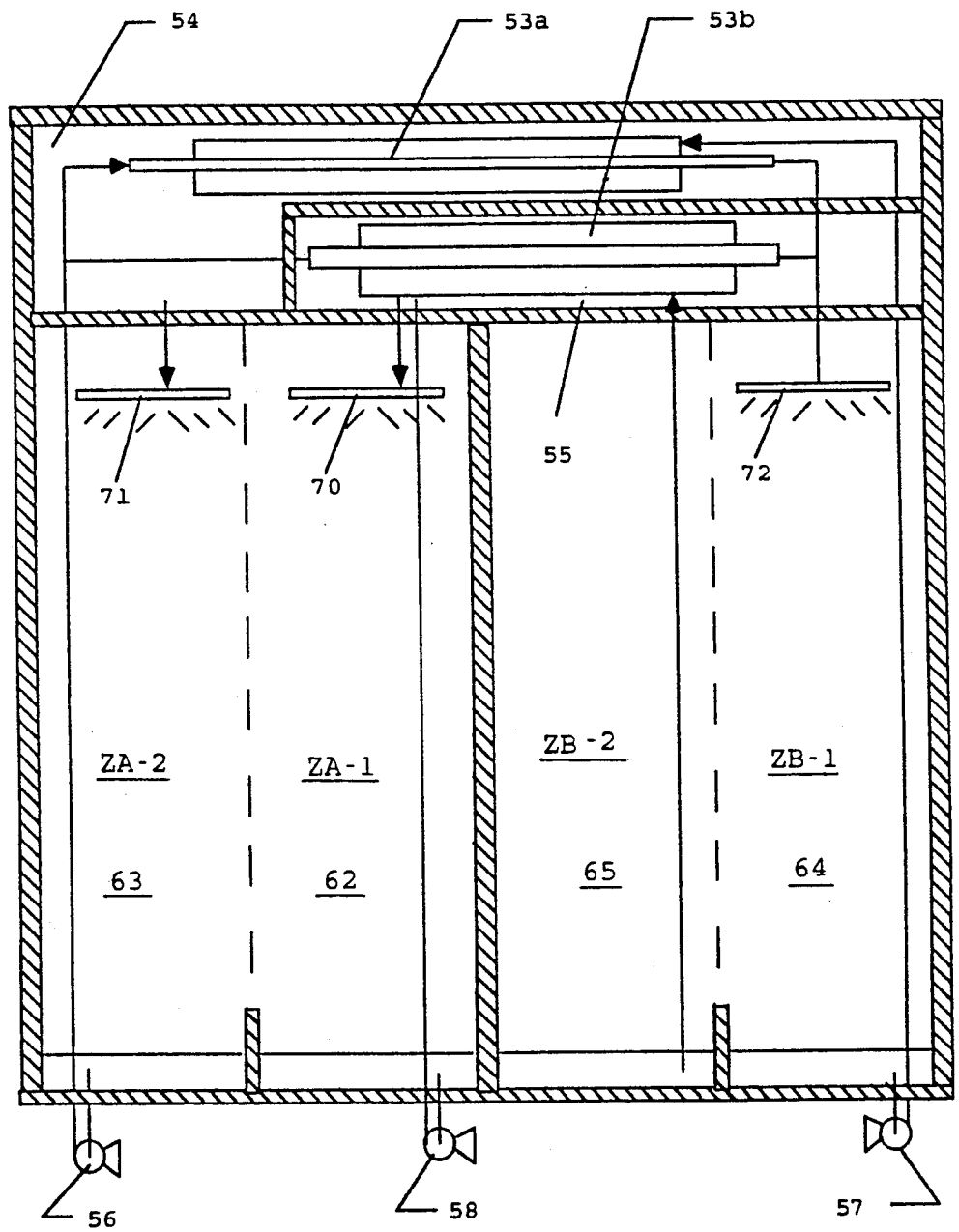
FIG. 16 illustrates an EA-RC panel which also includes heat exchangers and medium storages within the panel.
Figure 17:
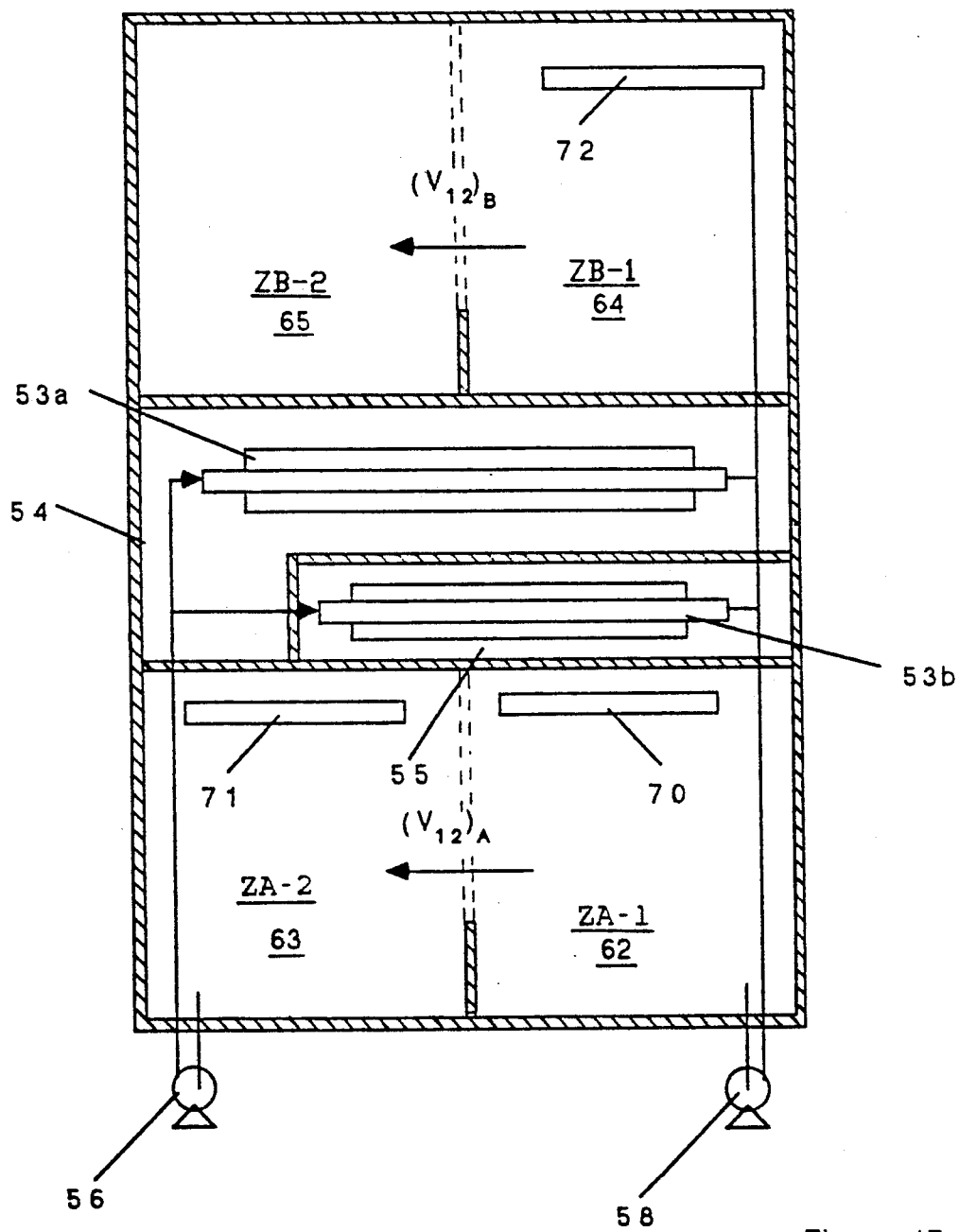
FIG. 17 illustrates another EA-RC panel similar to that of FIG. 16, except that the R-C portion of the panel is placed above the E-C portion of the panel and the heat exchangers and the medium storages are located in the middle portion of the panel.

FIG. 16 illustrates another type of EA-RC panel that has heat exchangers 53a, 53b, an absorbing solution sforage 54 and a water storage 55 in addition to a low pressure evaporation zone, ZA-1 (zone 62), a low pressure absorption zone, ZA-2 (zone 63), a high pressure regeneration zone, ZB-1 zone 64, and a high pressure condensing zone, ZB-2 (zone 65). The operational steps of a system using EA-RC panels described are similar to the operations of the system of FIGS. 15a and 15b. The major advantage of this type of panels are that they are modularized, can be mass produced, and can be made hermetically sealed. FIG. 17 illustrates yet another type of EA-RC panel that is similar to that of FIG. 16, except that the B-compartment with ZB-1 and ZB-2 zones are placed above the A-compartment with the ZA-1 and ZA-2 zones and that the storages 54, 55 and the heat exchangers 53a, 53b are placed in the middle region. The operational steps of a system with panels of FIG. 17 are similar to those of a system with panels of FIG. 16.

Figure 18:
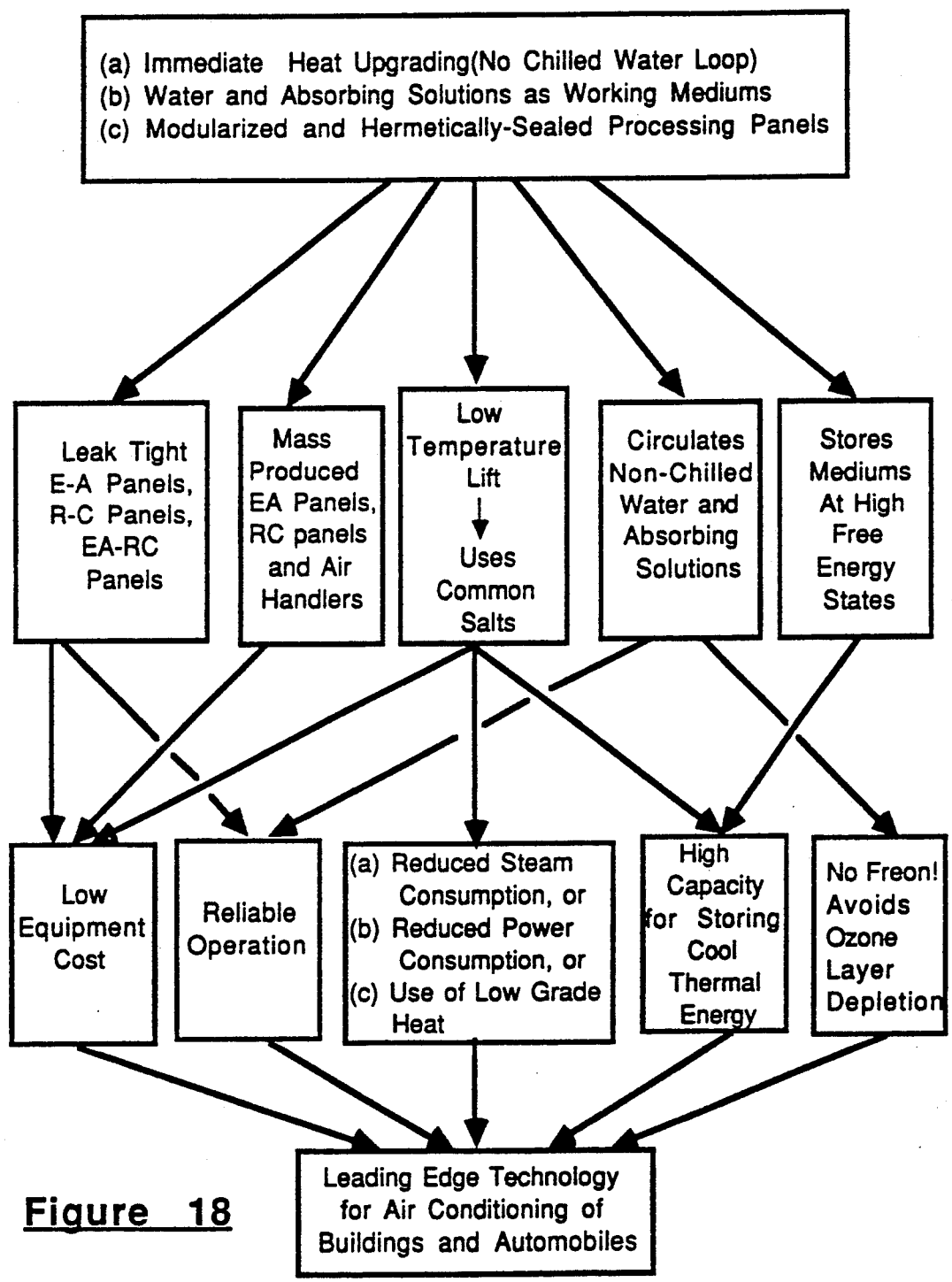
FIG. 18 summarizes the characteristic features and the advantages of the IHUA systems.

FIG. 18 summerizes the characteristic features and advantages of an Immediate Heat Upgrading Absorption Air Conditioning System of the present invention. It takes in heat from air to be cooled, upgrades it and discharges the upgraded heat to air or water to be heated immediately. It also introduces hermetically sealed E-A panels, R-C panels (also called E-C panels) and combined EA-RC panels. The temperature lift defined as the difference between the absorption temperature and the evaporation temperature in an E-A panel is greatly reduced. Therefore, one may use an absorbing solution containing a common salt, such as $CaCl_2$, or $MgCl_2$, rather than LiBr, which is rather expensive and may have some enviromental impact. EA panels, RC panels, and EA-RC panels are hermetically sealed panels and can be mass produced. Vapors $(V_{12})_A$ and $(V_{12})_B$ only travel short distances. Only water and an aqueous solution are stored and circulated. Freon is not used. Therefore, the use of air conditioning systems of the present invention does not cause ozone layer depletion. Cool storage can be provided by storing the weak absorbing solution, the strong absorbing solution and water and regenerate the absorbing solution at night, which is referred to as off peal hours for the power usage. It can therefore accomplish the desirable power levelling. Because of the low temperature lift, the steam required for regeneration is reduced, the electric power required for regeneration is reduced, and even waste heat can be used for regeneration. Because the panels used are hermetically sealed and can be mass produced, an IHUA air conditioning system can be reliably operated and the equipment cost is low. The cool storage system has a high cool thermal energy storing capacity.

What are claimed are as follows:

1. A heat upgrading absorption system for cooling or heating an air mass to be conditioned by taking heat in from a first mass of fluid at a first temperature and supplying heat to a second mass of fluid at a second temperature that is higher than the first temperature, one of the masses of fluid being the air mass to be conditioned, that comprises a first sub-system [denoted also as a Type A sub-system] that comprises one or more air handlers, each exchanging heat with the air mass to be conditioned, and each air handler comprises one or more Type A processing regions, and each Type A processing region comprises:

(a) a Type A enclosure surrounded by a Type A heat conductive wall;

(b) an evaporation zone [Zone A-1] and an absorption zone [Zone A-2] and a vapor passage between the two zones within the Type A enclosure;

(c) a first heat interaction zone [Zone A-3] that is outside of the Type A enclosure and is in heat communication with Zone A-1 through a first portion of the Type A heat conductive wall;

(d) a second heat interaction zone [Zone A-4] that is also outside of the Type A enclosure and is in heat communication with Zone A-2 through a second portion of the Type A heat conductive wall;

so that conduction of the following operational steps:

(a) introducing water into Zone A-1, (b) introducing a first absorbing solution into Zone A-2, (c) introducing the first mass of fluid into Zone A-3, and (d) introducing the second mass of fluid into Zone A-4;

lead to the occurance of the following operational steps:

(a) heat transfers from Zone A-3 to Zone A-1 to thereby cool the first mass of fluid in Zone A-3 and vaporize water in Zone A-1 to form a first water vapor;

(b) the first water vapor flows through the vapor passage from Zone A-1 to Zone A-2 and is absorbed into the absorbing solution to thereby release the heat of absorption and form a second diluted absorbing solution;

(c) heat transfers from Zone A-2 to Zone A-4 to thereby heat the second mass of fluid in Zone A-4.

2. A system of claim 1, wherein the first mass of fluid is the air mass to be conditioned and is thereby cooled and the second mass of fluid is a mass of outside air or a mass of water.

3. A system of claim 1, wherein the second mass of fluid is the air mass to be conditioned and is thereby heated and the first mass of fluid is a mass of outside air or a mass of water.

4. A system of claim 1, which further comprises a second sub-system [denoted also as a Type B sub-system] for concentrating the second absorbing solution to regenerate the first absorbing solution and produce a mass of water and a third sub-system [denoted also a Type C sub-system] for transferring the first absorbing solution and water into the first sub-system and removing the second absorbing solution from the first sub-system.

5. A system of claim 4 which further comprises a fourth sub-system [denoted also as a Type D sub-system] for storing a mass of water, a mass of the first absorbing solution and a mass of the second absorbing solution so that at least a portion of the second absorbing solution formed in the first sub-system during a first period of time is concentrated in the second sub-system during a second period of time different from the first period.

6. A system of claim 5, wherein at least a part of the second period of time is within the off peak hours of power consumption that includes at least a part of the period between 8:00 p.m. of a day and 8:00 a.m. of the next day.

7. A system of claim 4, wherein the second sub-system [denoted also as a Type B sub-system] comprises one or more Type B processing regions and each Type B type processing region comprises:

(a) a Type B enclosure surrounded by a Type B heat conductive wall;

(b) a concentration or regeneration zone [Zone B-1], a condensation zone [Zone B-2] and a vapor passage between the two zones within the Type B enclosure;

(c) a heat source zone [Zone B-3] that is outside of the Type B enclosure and is in heat communication with Zone B-1 through a first portion of the Type B heat conductive wall;

(d) a heat sink zone [Zone B-4] that is outside of the Type B enclosure and is in heat communication with Zone B-2 through a second portion of the Type B heat conductive wall;

so that conduction of the following operational steps:

(a) introducing the second absorbing solution into Zone B-1;

(b) introducing a heat source medium into Zone B-3;

(c) introducing a heat sink medium into Zone B-4 leads to the occurance of the following steps:

(a) heat transfers from Zone B-3 to Zone B-1 to vaporize water from the absorbing solution to thereby form a second vapor and concentrate the absorbing solution;

(b) the second vapor flows through the vapor passage from Zone B-1 to Zone B2 and is condensed therein to release heat of condensation and form a mass of condensate, which is water;

(c) heat transfers from Zone B-2 to Zone B-4 to thereby heat the heat sink medium.

8. A system of claim 7 wherein each Type B heat conductive wall of each Type B processing region forms a Type B processing panel having a first dimension in the thickness direction, a second dimension in the width direction and a third dimension in the height direction, and is characterized by that:
   (a) the first dimension is 5.0 cm or less;
   (b) Zone B-1 and Zone B-2 are inside of the panel;
   (c) Zone B-3 and Zone B-4 are outside of the panel.

9. A system of claim 8 wherein the first dimension of the Type B processing panel is 3.0 cm or less.

10. A system of claim 8 wherein the absorbing solution in Zone B-1 forms a falling liquid film.

11. A system of claim 8 which further comprises a fin assembly placed in Zone B-3.

12. A system of claim 8 which further comprises a fin assembly placed in Zone B-4.

13. A system of claim 4, wherein the Type AB combined sub-system that is formed by combining a first sub-system and a second sub-system comprises one or more Type AB processing regions and each Type AB processing region comprises:
   (a) a Type AB enclosure surrounded by a Type AB heat conductive wall;
   (b) a Type A processing compartment, a Type B processing compartment and a Type AB separator within the AB enclosure, the separator separating the A-compartment and the B-compartment;
   (c) an evaporation zone [Zone A-1], an absorption zone [Zone A-2] and a vapor passage between the two zones within the A-compartment;
   (d) a first heat interaction zone [Zone A-3] and a second heat interaction zone [Zone A-4] outside of the A-compartment and are respectively in heat communication with Zone A-1 and Zone A-2;
   (e) a concentration zone [Zone B-1], a condensation zone [Zone B-2] and a vapor passage between the two zones within the B-compartment;
   (f) a heat source zone [Zone B-3] and a heat sink zone [Zone B-4] outside of the B-compartment and are respectively in heat communications with Zone B-1 and Zone B-2;
so that conduction of the following operational steps:
   (a) introducing water in Zone A-1;
   (b) introducing a first absorbing solution into Zone A-2;
   (c) introducing a first mass of fluid into Zone A-3;
   (d) introducing a second mass of fluid into Zone A-4;
   (e) introducing a second absorbing solution into Zone B-1;
   (f) introducing a heat source medium into Zone B-3;
   (g) introducing a heat sink medium into Zone B-4;
leads to the occurance of the following operational steps:
   (a) heat transfers from the first mass of fluid in Zone A-3 to water in Zone A-1 to vaporize the water to form a first vapor and cool the first mass of fluid;
   (b) the first vapor is absorbed in the absorbing solution in Zone A-2 to form a second absorbing solution and transfer the heat of absorption to the second mass of fluid in Zone A-4;
   (c) heat transfer from the heat source medium in Zone B-4 to the solution in Zone B-1 to vaporize water from the solution to thereby form a concentrated solution and a second vapor;
   (d) the second vapor is condensed in Zone B-2 to form a mass of condensate and transfer heat of condensation to the heat sink medium in Zone B-4.

14. A system of claim 3, wherein one or more fin assemblies are installed within one or more of the following zones; (a) Zone A-3, (b) Zone A-4, (c) Zone B-3, and (d) Zone B-4, 15. A system of claim 13, which further comprises spraying devices installed within Zone A-1, Zone A-2 and Zone B-1 to form liquid films therein.

16. A system of claim 13, wherein the Type AB heat conductive wall of a Type AB processing region forms a Type AB processing panel having a first dimension in the thickness direction, a second dimension in the width direction and a third dimension in the height direction, and is characterized by that:
   (a) the first dimension is 5.0 cm or less;
   (b) Zone A-1, Zone A-2, Zone B-1 and Zone B-2 are inside of the panel;
   (c) Zone A-3, Zone A-4, Zone B-3 and Zone B-4 are outside of the panel.

17. A system of claim 16, wherein the first dimension of the Type AB panel is 3.0 cm or less.

18. A system of claim 16, wherein the Type AB processing panel comprises one or more heat exchangers and one or more liquid storing conpartments within the panel.

19. A system of claim 18, wherein the A-compartment containing Zone A-1 and Zone A-2 and B-compartment containing Zone B-1 and Zone B-2 are placed in side-by-side relation in the horizontal direction and the heat exchangers and liquid storing compartments are placed above the A- and B-compartments.

20. A system of claim 8, wherein the B-compartment is placed above the A-compartment and the heat exchangers and the liquid storing compartments are placed between the B-compartment and the A-compartment.

21. A system of claim 1, wherein the water introduced into Zone A-1 forms a falling liquid film and the absorbing solution introduced into Zone A-2 forms another falling liquid film.

22. A system of claim 1, which further comprises a fin assembly placed in Zone A-3.

23. A system of claim 1, which further comprises a fin assembly places in Zone A4.

24. A system of claim 1, wherein each Type A heat conductive wall of each Type A processing region forms a Type A processing panel having a first dimension in the thickness direction, a second dimension in the width direction and a third dimension in the height direction, and is characterized by that:
   (a) the first dimension is 5.0 cm or less;
   (b) Zone A-1 and Zone A-2 are inside of the panel;
   (c) Zone A-3 and Zone A-4 are outside of the panel.

25. A system of claim 24, which further comprises a fin assembly placed in Zone A-3.

26. A system of claim 24, which further comprises a fin assembly placed in Zone A-4.

27. A system of claim 1, wherein the first dimension of the Type A processing panel is 3.0 cm or less.

28. A heat upgrading absorption process for cooling or heating an air mass to be conditioned by taking heat in from a first mass of fluid at a first temperature and supplying heat to a second mass of fluid at a second temperature that is higher than the first temperature, one of the masses of fluid being the air mass to be conditioned, in a processing system that comprises a first sub-system [denoted also as a Type A subsystem] that comprises one or more air handlers, each exchanging heat with the air mass to be conditioned, and each air handler comprises one or more Type A processing regions, and each Type A processing region comprises:
- (a) a Type A enclosure surrounded by a Type A heat conductive wall;
- (b) an evaporation zone [Zone A-1] and an absorption zone [Zone A-2] and a vapor passage between the two zones within the Type A enclosure;
- (c) a first heat interaction zone [Zone A-3] that is outside of the Type A enclosure and is in heat communication with Zone A-1 through a first portion of the Type A heat conductive wall;
- (d) a second heat interaction zone [Zone A-4] that is also outside of the Type A enclosure and is in heat communication with Zone A-2 through a second portion of the Type A heat conductive wall;

so that conduction of the following operational steps:
- (a) step 1: introducing water into Zone A-1,
- (b) step 2: introducing a first absorbing solution into Zone A-2,
- (c) step 4: introducing the first mass of fluid into Zone A-3, and
- (d) step 4: introducing the second mass of fluid into Zone A-4;

lead to the occurance of the following operational steps:
- (e) step 5: heat transfers from Zone A-3 to Zone A-1 to thereby cool the first mass of fluid in Zone A-3 and vaporize water in Zone A-1 to form a first water vapor;
- (f) step 6: the first water vapor flows through the vapor passage from Zone A-1 to Zone A-2 and is absorbed into the absorbing solution to thereby release the heat of absorption and form a second and diluted absorbing solution;
- (g) step 7: heat transfers from Zone A-2 to Zone A-4 to thereby heat the second mass of fluid in Zone A-4.

29. A process of claim 28, wherein the first mass of fluid is the air mass to be conditioned and is thereby cooled and the second mass of fluid is a mass of outside air or a mass of water.

30. A process of claim 28, wherein the second mass of fluid is the air mass to be conditioned and is thereby heated and the first mass of fluid is a mass of outside air or a mass of water.

31. A process of claim 28, wherein the system further comprises a second sub-system for regenerating the absorbing solution and a third sub-system for transferring fluid streams and the process further comprising the following operational steps:
- (h) step 8: separating the second absorbing solution into a mass of water and a mass of concentrate which becomes the first absorbing solution in the second sub-system;
- (i) step 9: transferring water and the first absorbing solution from the second sub-system and through the third sub-system, into the first sub-system and transferring the second absorbing solution from the first sub-system, through the third sub-system and into the second sub-system.

32. A process of claim 28, wherein the system further comprises a second sub-system for regenerating the absorbing solution, a third sub-system for transferring fluid streams and a fourth sub-system that comprises a first fluid storage region, a second fluid storage region and a third fluid storage region and the process further comprises the following steps:
- (h) step 8: transferring the second absorbing solution from the first sub-system through the third sub-system into the first fluid storing region in the fourth sub-system;
- (i) step 9: transferring the second absorbing solution from the first fluid storing region of the fourth sub-system through the third sub-system into the second sub-system;
- (j) step 10: separating the second absorbing solution into a mass of water and a mass of concentrate, which becomes the first absorbing solution in the second sub-system;
- (k) step 11: transferring water and strong absorbing solution (produced in Step 10) through the third sub-system and into the second fluid storage region and the third fluid storage regions in the fourth sub-system;

step 1 and step 2 being conducted by transferring water and the first absorbing solution from the second and third fluid storage regions in the fourth sub-system through the third sub-system and into the first sub-system.

33. A process of claim 32, wherein steps 1, 2, 3, 4, 5, 6, 7 and 8 are conducted during a first period of time and steps 9, 10 and 11 are conducted during a second period of time different from the first period of time.

34. A process of claim 33, wherein at least a part of the second period of time is within the off peak hours of power consumption that includes at least a part of the period between 8:00 p.m. of a day and 8:00 a. m. of the next day.

35. A system of claim 28, wherein the water introduced into Zone A-1 forms a falling liquid film and the absorbing solution introduced into Zone A-2 forms another falling liquid film.

36. A process of claim 28, wherein step 5 comprises a sub-step of transferring heat through a fin assembly in Zone A-3.

37. A process of claim 28, wherein step 7 comprises a sub-step of transferring heat through a fin assembly in Zone A-4.

38. A system of claim 28, wherein each Type A heat conductive wall of each Type A processing region forms a Type A processing panel having a first dimension in the thickness direction, a second dimension in the width direction and a third dimension in the height direction, and is characterized by:
- (a) the first dimension is 3.0 cm or less;
- (b) Zone A-1 and Zone A-2 are inside of the panel;
- (c) Zone A-3 and Zone A-4 are outside of the panel.

39. A process of claim 38, wherein step 5 comprises a sub-step of transferring heat through a fin assembly in Zone A-3.

40. A process of claim 38, wherein step 7 comprises a sub-step of transferring heat through a fin assembly in Zone A-4.

* * * * *